United States Patent
Takahashi et al.

(10) Patent No.: US 10,991,219 B2
(45) Date of Patent: Apr. 27, 2021

(54) SECURITY SYSTEM AND METHOD FOR DISPLAYING IMAGES OF PEOPLE

(71) Applicant: Panasonic i-PRO Sensing Solutions Co., Ltd., Fukuoka (JP)

(72) Inventors: Hideaki Takahashi, Fukuoka (JP); Manabu Nakamura, Fukuoka (JP); Takamitsu Arai, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 0 days.

(21) Appl. No.: 16/394,927

(22) Filed: Apr. 25, 2019

(65) Prior Publication Data

US 2019/0251811 A1 Aug. 15, 2019

Related U.S. Application Data

(63) Continuation of application No. 15/745,865, filed as application No. PCT/JP2016/003552 on Aug. 2, 2016, now Pat. No. 10,276,007.

(30) Foreign Application Priority Data

Aug. 27, 2015 (JP) .................................. 2015-167936

(51) Int. Cl.
*G08B 13/196* (2006.01)
*G08B 23/00* (2006.01)
(Continued)

(52) U.S. Cl.
CPC ..... *G08B 13/19682* (2013.01); *G08B 13/196* (2013.01); *G08B 13/1966* (2013.01);
(Continued)

(58) Field of Classification Search
CPC ............ G08B 13/19682; G08B 13/196; G08B 13/19613; G08B 13/19645;
(Continued)

(56) References Cited

U.S. PATENT DOCUMENTS

2003/0043264 A1* 3/2003 Furuya ..................... H04N 7/18
348/65
2003/0206100 A1 11/2003 Richman et al.
(Continued)

FOREIGN PATENT DOCUMENTS

JP 09-224237 A 6/1997
JP 2011-165054 A 8/2011
(Continued)

*Primary Examiner* — Thai Q Tran
*Assistant Examiner* — Sunghyoun Park
(74) *Attorney, Agent, or Firm* — Seed IP Law Group LLP

(57) ABSTRACT

A security system includes a camera that captures an image of a monitoring area, a recorder that stores the captured image which is captured by the camera, a sensor that detects a matter in the monitoring area, a video monitoring and display device that causes a monitor to display the captured image of the monitoring area from the camera or the recorder, and a BLE reception device that detects a signal from a BLE transmission terminal which is installed or maintained by a guard who patrols the monitoring area. In a case where the matter is detected in the monitoring area, the video monitoring and display device extracts the captured images of the suspect or the guard, chronologically arranges the captured images, and displays the captured images on the monitor. Furthermore, in a case where the video monitoring and display device displays the captured images of the guard, the video monitoring and display device also displays positional information of the BLE transmission terminal in association with the captured images of the guard.

10 Claims, 22 Drawing Sheets

(51) Int. Cl.
  *G08B 25/00* (2006.01)
  *G08B 25/04* (2006.01)
  *H04N 7/18* (2006.01)

(52) U.S. Cl.
  CPC ... *G08B 13/1968* (2013.01); *G08B 13/19613* (2013.01); *G08B 13/19645* (2013.01); *G08B 23/00* (2013.01); *G08B 25/00* (2013.01); *G08B 25/04* (2013.01); *H04N 7/18* (2013.01)

(58) Field of Classification Search
  CPC ............ G08B 13/1966; G08B 13/1968; G08B 23/00; G08B 25/00; G08B 25/04; H04N 7/18
  See application file for complete search history.

(56) References Cited

U.S. PATENT DOCUMENTS

| | | | |
|---|---|---|---|
| 2004/0085446 A1* | 5/2004 | Park | H04N 7/173 348/143 |
| 2006/0208857 A1 | 9/2006 | Wong | |
| 2007/0291118 A1 | 12/2007 | Shu et al. | |
| 2008/0098068 A1* | 4/2008 | Ebata | H04L 51/00 709/206 |
| 2008/0285787 A1 | 11/2008 | Hammadou | |
| 2010/0111377 A1 | 5/2010 | Monroe | |
| 2010/0238019 A1 | 9/2010 | Richman et al. | |
| 2011/0007139 A1* | 1/2011 | Brunetti | G08B 13/19613 348/51 |
| 2011/0037850 A1 | 2/2011 | Tsou | |
| 2011/0249861 A1* | 10/2011 | Tokutake | G11B 27/34 382/103 |
| 2013/0135464 A1* | 5/2013 | Kuroki | H04W 4/023 348/135 |
| 2013/0329950 A1* | 12/2013 | Yang | G06K 9/62 382/103 |
| 2014/0019768 A1 | 1/2014 | Pineau et al. | |
| 2014/0365980 A1* | 12/2014 | Morrison | G06T 19/006 715/863 |
| 2015/0016798 A1* | 1/2015 | Fujimatsu | G11B 27/30 386/223 |
| 2015/0248584 A1* | 9/2015 | Greveson | G06K 9/00476 382/113 |
| 2015/0356840 A1* | 12/2015 | Wang | G08B 13/19682 382/103 |

FOREIGN PATENT DOCUMENTS

| | | | | |
|---|---|---|---|---|
| JP | 2011-227851 A | 11/2011 | | |
| WO | WO-2014049372 A1 * | 4/2014 | | G06K 9/52 |
| WO | WO-2014122884 A1 * | 8/2014 | | G08B 13/19608 |

* cited by examiner

FIG. 5
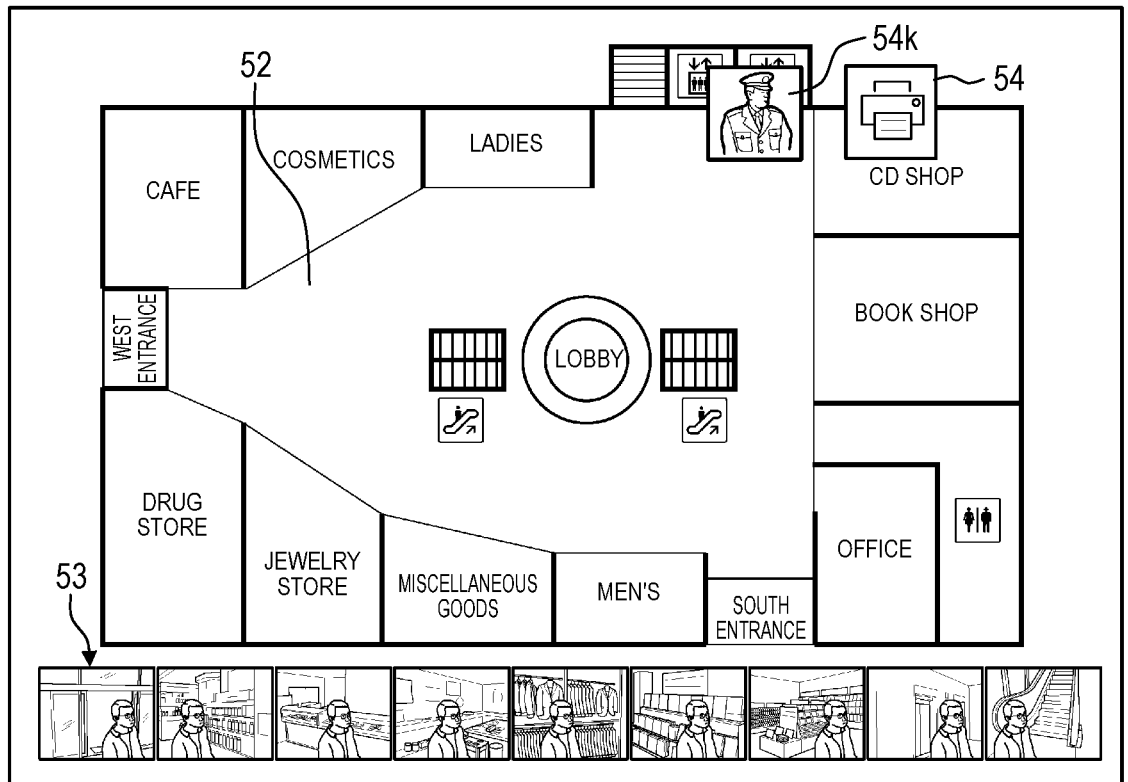
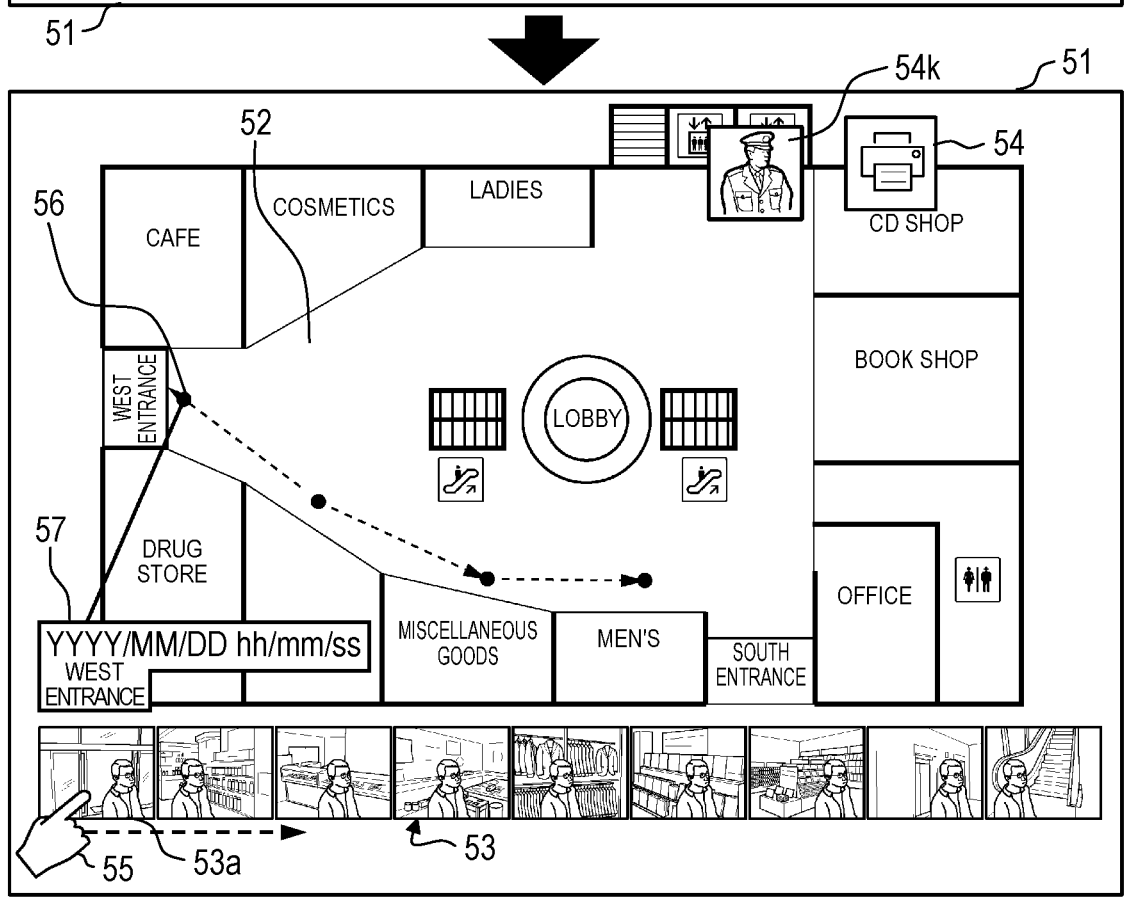

FIG. 7
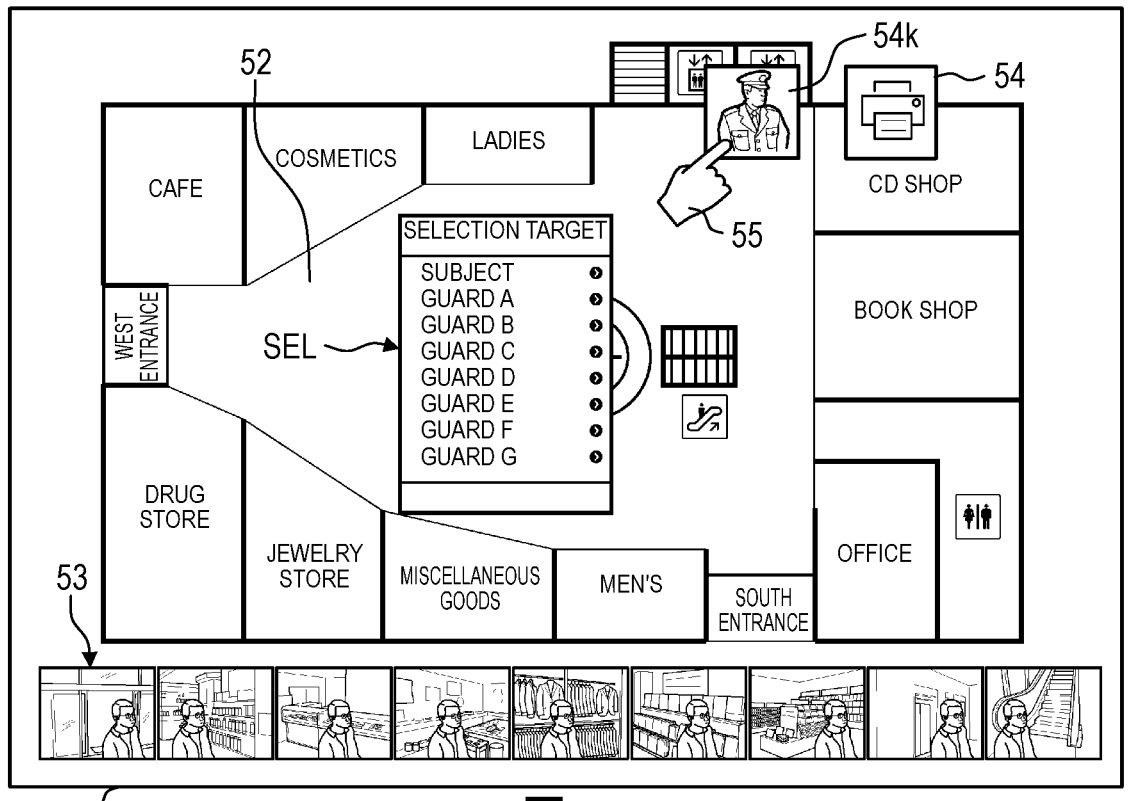
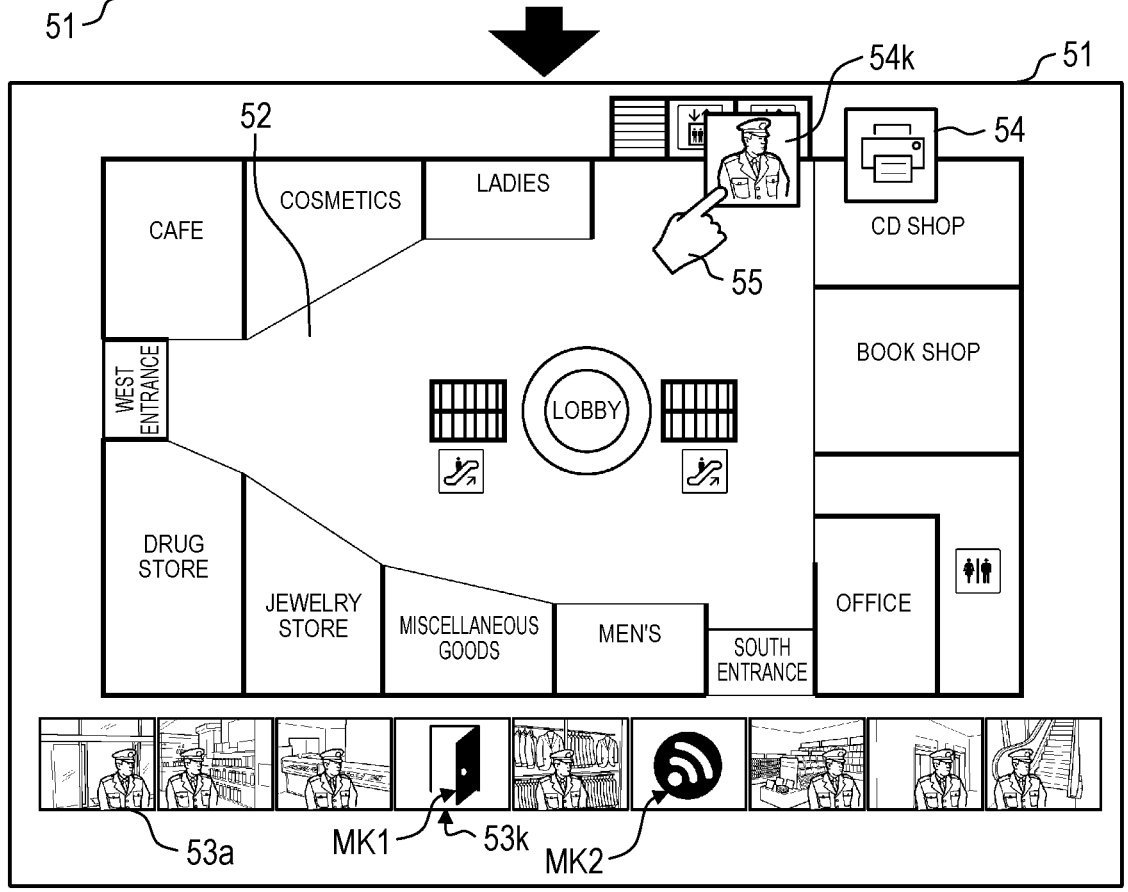

FIG. 10
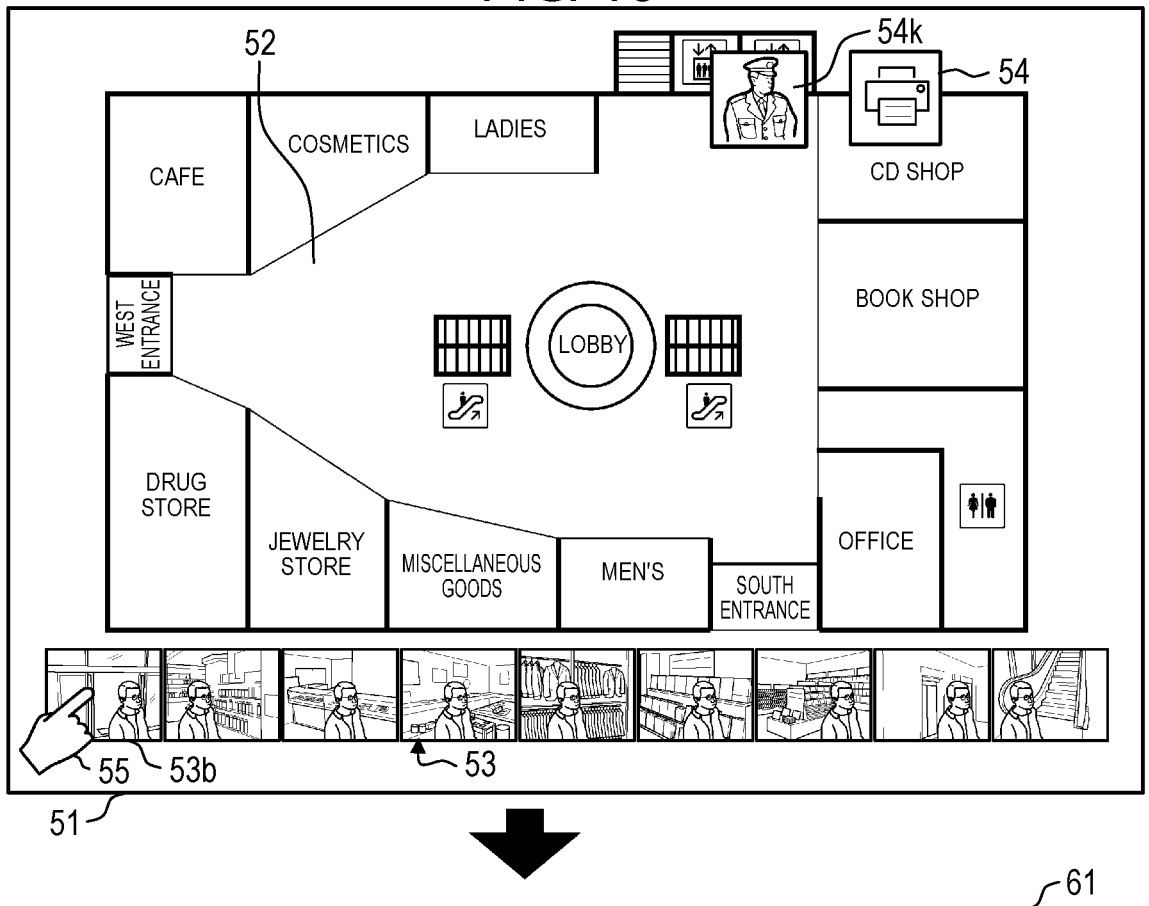
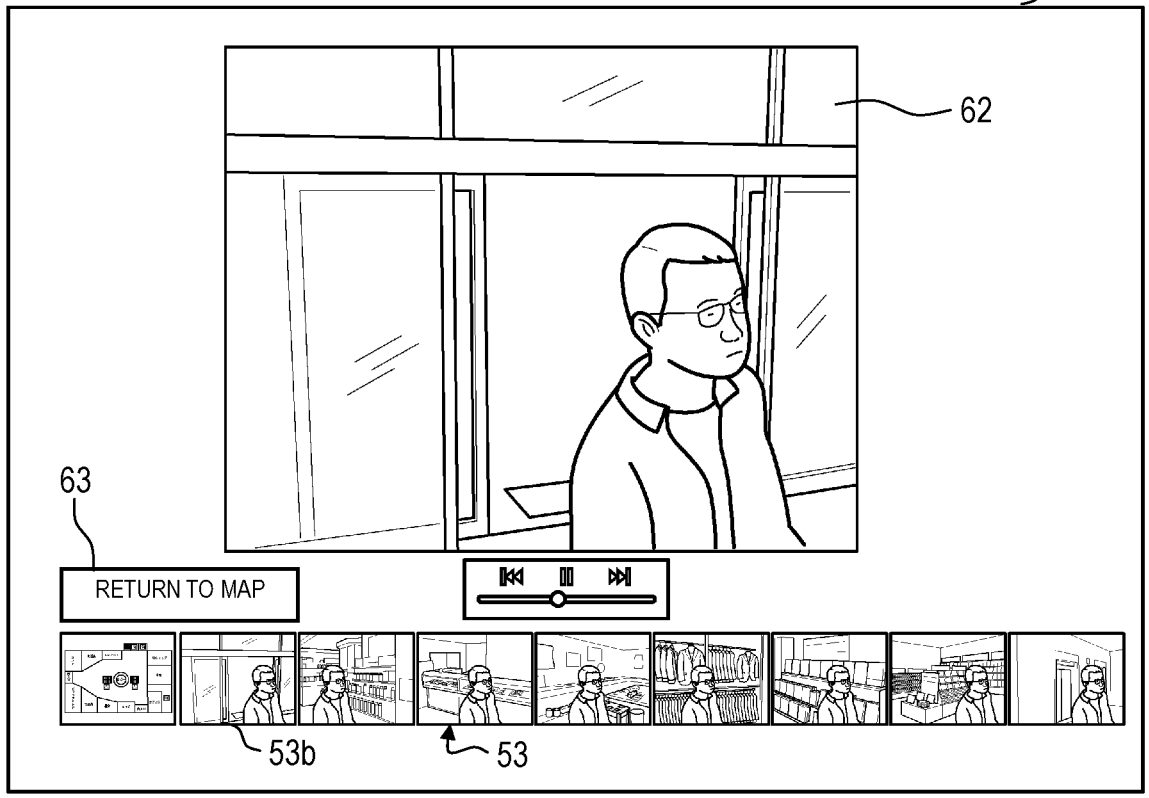

FIG. 23
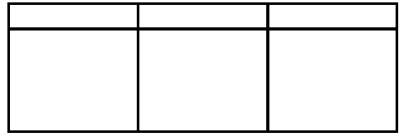

FIG. 24

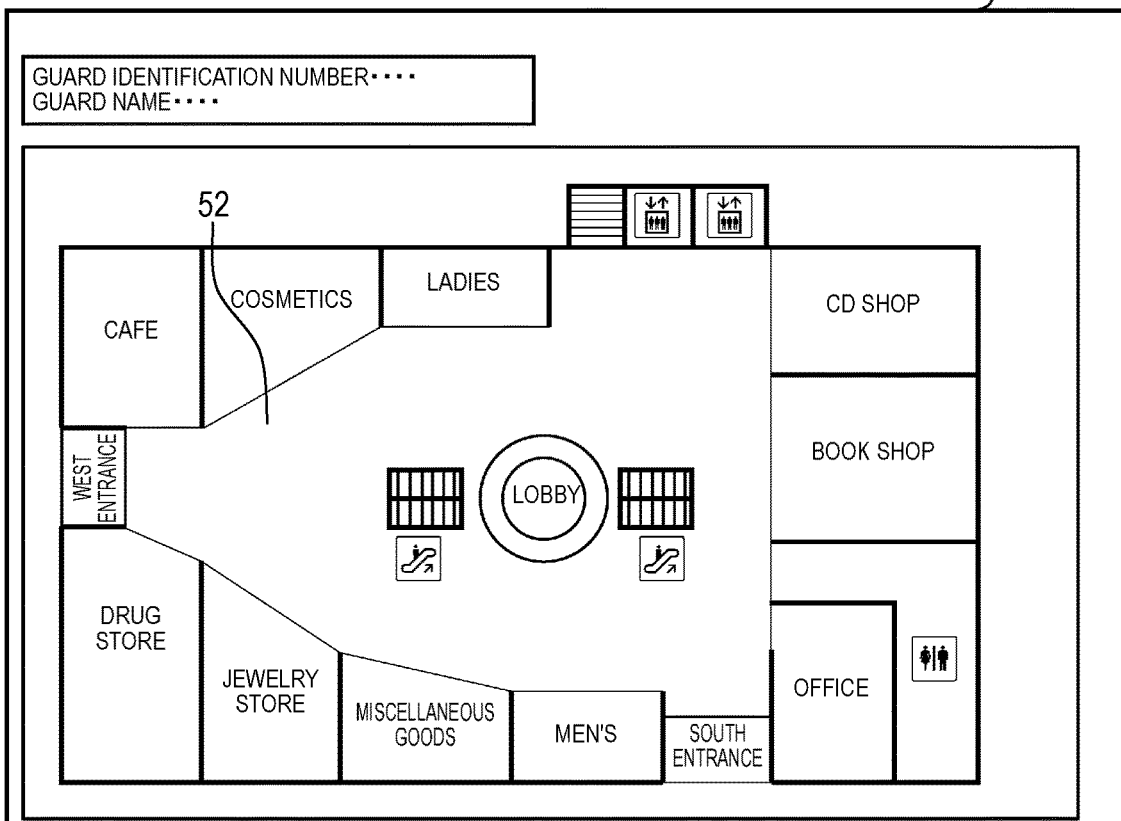

GUARD IDENTIFICATION NUMBER····
GUARD NAME····

WEST ENTRANCE
YYYY/MM/DD HH:mm:ss

JEWELRY SHOP
YYYY/MM/DD HH:mm:ss

COSMETICS DEPARTMENT
YYYY/MM/DD HH:mm:ss

< BEHAVIOR HISTORY>
YEAR/MONTH/DATE, PLACE NAME, ACQUISITION DEVICE NAME, EVENT NAME
YYYY/MM/DD HH:mm:ss, WEST ENTRANCE, DOOR T1, AUTHENTICATION OK
YYYY/MM/DD HH:mm:ss, JEWELRY SHOP, CAMERA 11-2, COLLATION
YYYY/MM/DD HH:mm:ss, SOUTH ENTRANCE, DOOR T2, AUTHENTICATION OK
YYYY/MM/DD HH:mm:ss, PARKING LOT, BLE TRANSMISSION TERMINAL BT3, 10m
YYYY/MM/DD HH:mm:ss, SOUTH ENTRANCE, DOOR T2, AUTHENTICATION OK
YYYY/MM/DD HH:mm:ss, COSMETICS DEPARTMENT, CAMERA 11-3, COLLATION

CAPTURED ATTACHMENT INFORMATION

BEHAVIOR HISTORY

SECURITY SYSTEM AND METHOD FOR DISPLAYING IMAGES OF PEOPLE

TECHNICAL FIELD

The present disclosure relates to a security system and a method for displaying images of people, which monitor a monitoring target person using monitoring cameras and, in a case where a predetermined matter occurs, display images of a suspect who is supposed to be related to occurrence of the matter or a guard who patrols a monitoring area.

BACKGROUND ART

Recently, there are many cases where a plurality of monitoring cameras are installed in various places, such as a large store (for example, a do-it-yourself store or a shopping mall), a public facility (for example, a station or a stadium), an office, a plant, and a warehouse, and the respective monitoring cameras photograph a monitoring target, such as a person, in a monitoring area of each of the monitoring cameras. In addition, in a case where a predetermined matter (or also referred to as an "event"), such as an accident, occurs in the monitoring area, a security system, which informs or reports a manager of a monitoring target place, a security contract company, a police officer, or the like using the types of monitoring cameras, has been used.

As an example of a security system according to the related art, as disclosed, for example, in PTL 1, a security system has been known which detects a suspicious person who intrudes into a monitoring area in the vicinity of a building, and gives an alarm. In a case where a first mobile body who is a permitted person to enter a monitoring area and a second mobile body who is a non-permitted person to enter the monitoring area are simultaneously detected in the monitoring area, the security system determines whether or not the non-permitted person is a suspicious person according to a moving locus of the permitted person and a moving locus of the non-permitted person. Therefore, the security system is capable of accurately detecting, for example, a housebreaker who tries to intrude into indoors by threatening a user.

CITATION LIST

Patent Literature

PTL 1: Japanese Patent Unexamined Publication No. 2011-165054

SUMMARY OF THE INVENTION

The security system of PTL 1 has functions of determining a suspicious person and providing a notification in a case where the suspicious person is detected, and thus it is possible to take actions, such as recognition of presence of the suspicious person and rush toward a site, based on the notification. However, in the configuration of PTL 1, for example, in a case where a security report, which shows any behavior record (behavior history) of the suspect or a guard who traces the suspect, is acquired in a case where an accident occurs, a long time is required for a security report preparation work like the user manually selects and displays images in which the suspect or the guard is captured among a plurality of images which are captured and recorded by monitoring cameras. Therefore, it is difficult to simply acquire intuitive and visual behavior history of the suspect or the guard like chronological and visual grasp of the behavior history of the suspect or the guard related to the accident before and after occurrence of any matter or accident in the monitoring area.

The present disclosure is made to solve the above-described problems according to the related art, and an object of the present disclosure is to provide a security system and a method for displaying images of people in which it is possible to simply show intuitive and visual behavior history of a suspect or a guard who traces the suspect related to occurrence of any matter or accident in a monitoring area.

The present disclosure, provides security system including: a camera that captures an image of a monitoring area; a recorder that stores the captured image of the monitoring area which is captured by the camera; a sensor that detects a matter in the monitoring area; a video monitoring and display device that causes a display unit to display the captured image of the monitoring area from the camera or the recorder; and a code detection device that detects a code which is installed or maintained by a guard who patrols the monitoring area, in which the video monitoring and display device extracts a plurality of captured images, in which a suspect of the matter is captured, in a case where the matter is detected in the monitoring area, and displays a first transitional captured image, in which the plurality of extracted captured images are chronologically arranged along captured time, and map information of the monitoring area, and extracts a plurality of captured images, in which the guard is captured, and the code which is detected by the code detection device according to a switching operation from the suspect to the guard, and displays a second transitional captured image, in which the plurality of extracted captured images and a marker indicative of the code are chronologically arranged along the captured time or detection time, and the map information of the monitoring area in a switching manner.

In addition, the present disclosure provides a method for displaying images of people in a security system, which includes a camera, a recorder, a sensor, a code detection device, and a video monitoring and display device, the method including: capturing an image of a monitoring area by the camera; storing the captured image, which is captured by the camera, by the recorder; detecting a matter in the monitoring area by the sensor; detecting a code, which is installed or maintained by a guard who patrols the monitoring area, by the code detection device; and causing a display unit to display the captured image of the monitoring area from the camera or the recorder by the video monitoring and display device, wherein the displaying of the captured image of the monitoring area in the video monitoring and display device includes extracting a plurality of captured images, in which a suspect of the matter is captured, in a case where the matter is detected in the monitoring area, and displaying a first transitional captured image, in which the plurality of extracted captured images are chronologically arranged along captured time, and map information of the monitoring area, and extracting a plurality of captured images, in which the guard is captured, and the code which is detected by the code detection device according to a switching operation from the suspect to the guard, and displaying a second transitional captured image, in which the plurality of extracted captured images and a marker indicative of the code are chronologically arranged along the captured time or detection time, and the map information of the monitoring area in a switching manner.

In addition, the present disclosure provides a security system including: a camera that captures an image of a monitoring area; a recorder that stores the captured image of the monitoring area which is captured by the camera; a sensor that detects a matter in the monitoring area; a video monitoring and display device that causes a display unit to display the captured image of the monitoring area from the camera or the recorder; and a code detection device that detects a code which is installed or maintained by a guard who patrols the monitoring area, wherein the video monitoring and display device extracts a plurality of captured images, in which the guard is captured in a case where the matter is detected in the monitoring area by the sensor, and the code based on the code detected by the code detection device, and displays transitional captured images, in which the plurality of extracted captured images and a marker indicative of the code are chronologically arranged along captured time or detection time, and map information of the monitoring area.

Furthermore, the present disclosure provides a method for displaying images of people in a security system, which includes a camera, a recorder, a sensor, a code detection device, and a video monitoring and display device, the method including: capturing an image of a monitoring area by the camera; storing the captured image, which is captured by the camera, by the recorder; detecting a matter in the monitoring area by the sensor; detecting a code which is installed or maintained by a guard who patrols the monitoring area by the code detection device; and causing a display unit to display a captured image of the monitoring area from the camera or the recorder by the video monitoring and display device; wherein the displaying of the captured image of the monitoring area in the video monitoring and display device includes extracting a plurality of captured images, in which a guard is captured in a case where the matter is detected in the monitoring area by the sensor based on the code detected by the code detection device, and the code, and displaying transitional captured images, in which the plurality of extracted captured images and a marker indicative of the code are chronologically arranged along captured time or detection time, and map information of the monitoring area.

According to the present disclosure, it is possible to simply show intuitive and visual behavior history of a suspect related to occurrence of any matter or accident in a monitoring area and a guard who traces the suspect.

BRIEF DESCRIPTION OF DRAWINGS

FIG. 5 is a diagram illustrating an example of a transitional captured image display screen on which transitional captured images based on captured images of a suspect and map information of a monitoring area are displayed.

FIG. 7 is a diagram illustrating a switching example from the transitional captured image display screen illustrated in FIG. 5 to a transitional captured image display screen on which the transitional captured images are displayed based on the positional information of the guard.

FIG. 10 is a diagram illustrating an example of a reproduction screen of a moving image corresponding to captured images in a case where any captured image is clicked in the transitional captured image display screen illustrated in FIG. 5.

FIG. 23 is a diagram illustrating an example of a report which is printed out as the security report which includes the captured images of the guard.

FIG. 24 is a diagram illustrating an example of a subsequent page of the report illustrated in FIG. 23.

DESCRIPTION OF EMBODIMENTS

Hereinafter, embodiments (hereinafter, referred to as "the embodiments"), in which a security system and a method for displaying images of people according to the present disclosure are disclosed in detail, will be described in detail with reference to the accompanying drawings appropriately. There is a case where unnecessarily detailed description is omitted. For example, there is a case where detailed description of already well-known items or duplicated description with respect to substantially the same configuration is omitted. The reason for this is that unnecessary redundancy of description below is avoided such that those skilled in the art easily understand. Meanwhile, the accompanying drawings and the description below are provided such that those skilled in the art sufficiently understand the present disclosure, and do not intend to limit subjects disclosed in claims.

In the embodiment, as an example of the security system, a configuration example of a system is illustrated in which a plurality of monitoring cameras are provided in respective places of a complex store, such as a shopping mall, as a monitoring area so as to photograph the monitoring area, and which makes a repot including captured images of a suspect who causes the matter and a guard who traces the suspect in a case where any matter (for example, an accident such as robbery) occurs in the monitoring area. However, embodiments of the security system and the method for displaying images of people according to the present disclosure are not limited to content of the embodiment which will be described later.

[Configuration of Security System]

Figure 1:
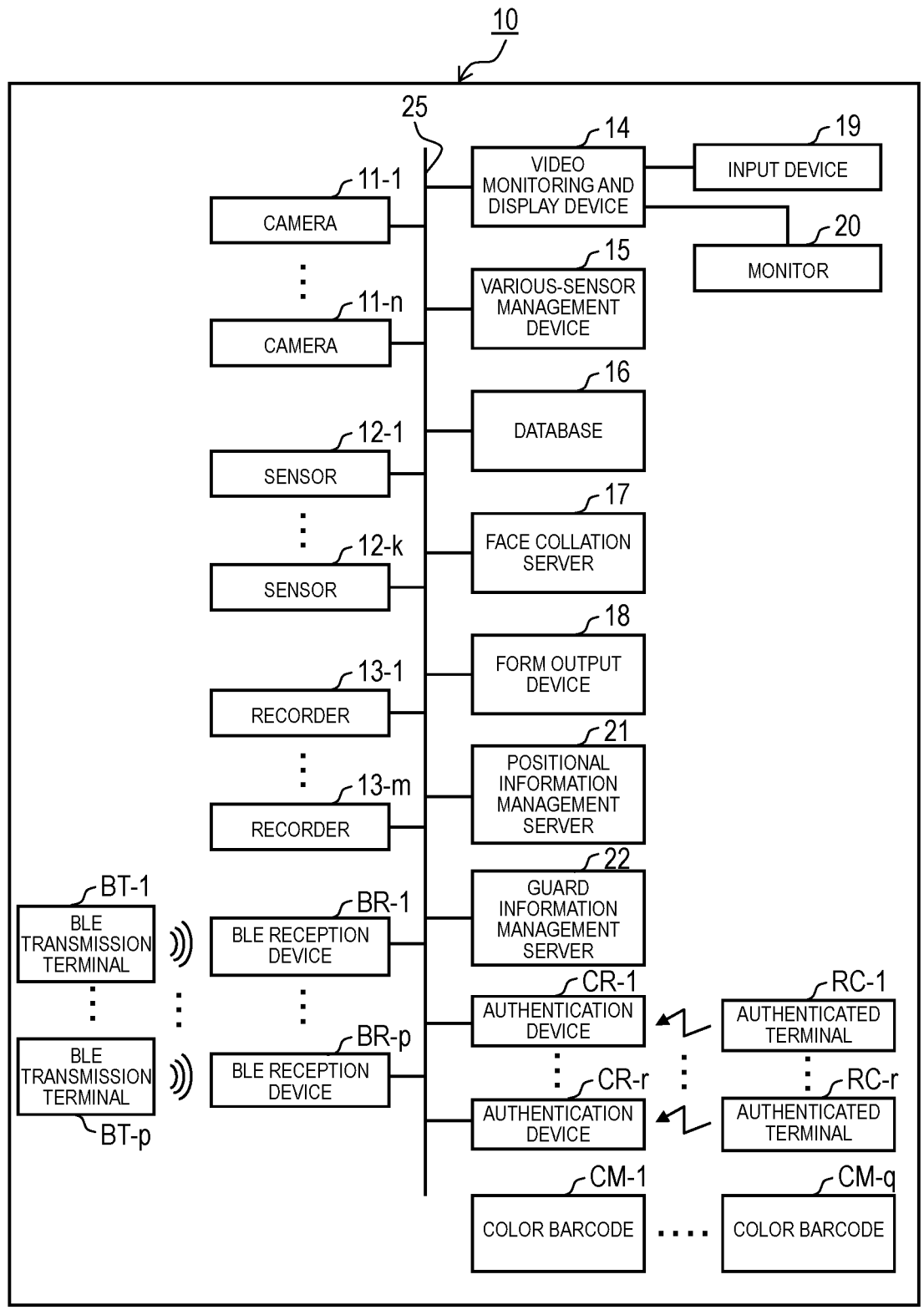
FIG. 1 is a block diagram illustrating an example of a system configuration of a security system according to an embodiment.

FIG. 1 is a block diagram illustrating an example of a system configuration of security system 10 according to the embodiment. Security system 10 includes a plurality of cameras 11-1 to 11-$n$, a plurality of various sensors 12-1 to 12-$k$, and a plurality of recorders 13-1 to 13-$m$. Here, n, k, and m are integers which are equal to or larger than 2.

Cameras 11-1 to 11-$n$ include lenses and image sensors, are provided in respective places to be able to photograph fixed places in the monitoring areas, and are attached to ceilings, walls, or the like of the respective installation places. For example, a wide-angle lens, in which a wide viewing angle of a 140° or more is acquired, is used as the lens, and a subject image in a field of view is focused on an imaging surface (light receiving surface) of the image sensor. For example, the image sensor is an imaging device which includes a Charge-coupled Device (CCD), a Complementary Metal Oxide Semiconductor (CMOS), or the like, and converts an optical image which is focused on an imaging surface (light receiving surface) into an electrical signal. Any n cameras 11-1 to 11-$n$ are provided according to conditions of installation places, a system configuration, or the like. Cameras 11-1 to 11-$n$ capture subjects in respective installation places where cameras 11-1 to 11 are disposed, and acquire camera photographing videos in respective monitoring areas. Cameras 11-1 to 11-$n$ photograph, for example, moving images in the respective monitoring areas as the camera photographing videos.

For example, any one of various sensors, such as a shoplifting preventing gate, a face collation alarm, a fire alarm box, a metal detector, an object sensor, and a touch sensor, is used as sensors 12-1 to 12-$k$, and sensors are provided at respective places of the monitoring areas according to installation places and detection object. Any k sensors 12-1 to 12-$k$ are provided according to the conditions of the installation places, the system configuration, or the like. Sensors 12-1 to 12-$k$ output pieces of alarm information in a case where a detection target person, an object, a matter, or the like is detected. For example, in a case where a shoplifting preventing tag is given to a non-purchased commodity in a store and a shoplifter passes through the shoplifting preventing gate after shoplifting the commodity without purchasing, the shoplifting preventing gate as an example of the sensor rings an alarm (that is, outputs the alarm information).

Recorders 13-1 to 13-$m$ include storage devices, such as hard disks or semiconductor memories, and store (record) the camera photographing videos captured by cameras 11-1 to 11-$n$. Any m recorders 13-1 to 13-$m$ are provided according to the installation place condition, the system configuration, or the like. Recorders 13-1 to 13-$m$ may store camera photographing images, which are still images generated from the moving image, in addition to the moving images of the camera photographing videos, as the recorded video.

In addition, security system 10 includes video monitoring and display device 14, various-sensor management device 15, database 16, face collation server 17, form output device 18, input device 19, and monitor 20.

Cameras 11-1 to 11-$n$, various sensors 12-1 to 12-$k$, recorders 13-1 to 13-$m$, video monitoring and display device 14, various-sensor management device 15, database 16, face collation server 17, form output device 18, positional information management server 21, guard information management server 22, BLE reception devices BR-1 to BR-p, and authentication devices CR-1 to CR-r are connected to each other via network 25, and thus it is possible to transmit and receive data or information. Network 25 is a wireless network or a wired network. For example, the wireless network includes a wireless Local Area Network (LAN), a wireless Wide Area Network (WAN), 3G, Long Term Evolution (LTE), and Wireless Gigabit (WiGig). For example, the wired network includes the Intranet or the Internet.

Video monitoring and display device 14 includes a computer (for example, a Personal Computer (PC)), and performs various processes related to the camera photographing videos which are the moving images or the camera photographing images which are the still images (hereinafter, collectively referred to as a "captured image") through cooperation of a processor and a memory according to a predetermined computer program. For example, video monitoring and display device 14 is formed using a processor such as a Central Processing Unit (CPU), a Micro Processing Unit (MPU) or a Digital Signal Processor (DSP), a working memory such as a Random Access Memory (RAM) or a flash memory, a program memory such as a Read Only Memory (ROM), a data memory, and a communication interface which transmits and receives data. Video monitoring and display device 14 performs processes of inputting the captured images from cameras 11-1 to 11-$n$ and recorders 13-1 to 13-$m$, positional information of the guard (refer to below description) stored in positional information management server 21, and guard information stored in guard information management server 22, displaying the captured images, and generating a report as a security report which will be described later.

Various-sensor management device 15 includes computer (for example, a PC), and performs various processes related to management of the alarm information which is output by various sensors 12-1 to 12-$k$ in a case where the processor and the memory cooperate according to the predetermined computer program. For example, various-sensor management device 15 sets detection conditions of respective sensors 12-1 to 12-$k$, manages management information including the detection conditions of sensors 12-1 to 12-$k$, and outputs the management information of sensor 12-1- to 12-$k$ to video monitoring and display device 14. Various-sensor management device 15 may include the same computer as video monitoring and display device 14.

In a case where at least one of sensors 12-1 to 12-k, in which respective detection conditions are set, outputs the alarm information and the alarm information is acquired (received), video monitoring and display device 14 recognizes that a predetermined matter (for example, some kinds of trouble or accident) around the sensor, which outputs the alarm information in the monitoring area, is detected by the sensor. Meanwhile, the matter detected by sensors 12-1 to 12-k includes an event in which any one of cameras 11-1 to 11-n detects a specific person, an object, or the like using captured images acquired by the relevant camera, and, in this case, cameras 11-1 to 11-n function as sensors 12-1 to 12-k. In the embodiment, various-sensor management device 15 sets occurrence of an accident, such as robbery, as the detection condition. Under the setting, video monitoring and display device 14 recognizes the occurrence of the accident through input of the alarm information which is output by the sensor in response to the detection condition.

Database 16 includes a storage device (for example, a hard disk), and preserves facial information of a person who exists in the captured images which are captured by cameras 11-1 to 11-n. For example, the facial information preserved in database 16 is information acquired by associating data of respective facial images with facial feature metadata indicative of features of the facial images.

Face collation server 17 includes a computer (for example, a PC), and performs a process for collating the pieces of facial information in the captured images which are captured by cameras 11-1 to 11-n in a case where the processor and the memory cooperate according to the predetermined computer program for a server. Face collation server 17 includes a feature data acquirer (not illustrated in the drawing) that acquires facial image data (including thumbnails) and the facial feature metadata, a face collator (not illustrated in the drawing) that compares and collates collation target facial image and collation-based facial feature metadata and determines whether or not the collation target facial image coincides with the collation-based facial feature metadata, and a communicator (not illustrated in the drawing) that transmits and receives the facial information.

Face collation server 17 collates whether or not the person who appears in the captured images captured by cameras 11-1 to 11-n or the captured images stored in recorders 13-1 to 13-m is the same (that is, the same person) as the facial image preserved in database 16 using the facial images and the feature metadata which are preserved in database 16. In the embodiment, face collation server 17 performs face collation of a person (in other words, a suspect) who causes the matter (for example, the accident) detected by the sensor or a guard who traces the suspect, determines facial images, which coincide with a face of the suspect or the guard, among the plurality of captured images, and extracts captured images in which the suspect or the guard is captured. The extracted captured images are preserved in database 16.

Form output device 18 as an example of a printing device includes, for example, a printer which has a printing function, is connected to video monitoring and display device 14, and prints out a document corresponding to a report (see FIGS. 22 to 24) which includes the captured images generated by video monitoring and display device 14. Meanwhile, form output device 18 may output document data of the report as a security report to another device, for example, a monitoring center or the like, which is provided on the outside, of a security contract company via the network.

Input device 19 includes, for example, a mouse, a keyboard, a touch panel, or a touch pad, is connected to video monitoring and display device 14, and inputs instructions related to various operations and settings to video monitoring and display device 14 according to an input operation performed by the user.

Monitor 20 includes, for example, a display device using a Liquid Crystal Display (LCD) or an organic Electroluminescence (EL), is connected to video monitoring and display device 14, and displays various display screens related to the captured images generated by video monitoring and display device 14. In a case where a touch panel is used as input device 19, input device 19, which uses a translucent touch sensor, is disposed to overlap monitor 20. Therefore, monitor 20 as the display device and the touch panel as the input device are combined with each other, and thus it is possible for the user to perform intuitive operation. In a case where input device 19 and monitor 20 are combined and used, it is possible to use a smart phone or a tablet terminal as video monitoring and display device 14.

In addition, security system 10 includes BLE transmission terminals BT-1 to BT-p, BLE reception devices BR-1 to BR-p, authenticated terminals RC-1 to RC-r, authentication devices CR-1 to CR-r, color barcodes CM-1 to CM-q, positional information management server 21, and guard information management server 22. Here, p, r, and q are integers which are equal to or larger than 2.

Hereinafter, in a case where the same description is possible without distinguishing cameras 11-1 to 11-n, sensors 12-1 to 12-k, recorders 13-1 to 13-m, BLE transmission terminals BT-1 to BT-p, BLE reception devices BR-1 to BR-p, authenticated terminals RC-1 to RC-r, authentication devices CR-1 to CR-r, and color barcodes CM-1 to CM-q, respectively, reference symbols thereof are abbreviated as camera 11, sensor 12, recorder 13, BLE transmission terminal BT, BLE reception device BR, authenticated terminal RC, authentication device CR, and color barcode CM (see FIG. 2).

BLE transmission terminal BT as an example of a code is, for example, a transmitter which is installed or possessed in a chest pocket of a uniform of the guard who patrols the monitoring area or traces the suspect. BLE transmission terminal BT transmits, for example, a signal used to show the positional information of the guard in a communication service area of Bluetooth (registered trademark) which is a near field wireless communication technology. Here, BLE transmission terminal BT and BLE reception device BR have communication functions using Bluetooth (registered trademark) Low Energy (BLE) which is one of extension use of Bluetooth (registered trademark). BLE transmission terminal BT is capable of transmitting, for example, a signal used to show the positional information of the guard in a range of a radius of 10 m centering on BLE transmission terminal BT.

BLE reception device BR as an example of a code detection device is a receiver that is installed in each place of the monitoring area and receives the signal transmitted from BLE transmission terminal BT. In a case where BLE reception device BR receives a signal from BLE transmission terminal BT, BLE reception device BR is capable of grasping the positional information of the guard who installs or maintains BLE transmission terminal BT, and preserves the positional information of the guard in positional information management server 21.

Authenticated terminal RC as an example of the code is, for example, an authenticated medium which is installed or possessed on the chest pocket of the uniform of the guard who patrols the monitoring area or traces the suspect. Authenticated terminal RC is, for example, a card which maintains an IC chip stored in a transceiver (not illustrated in the drawing) that transmits and receives a signal for authentication between an identification information preservation unit (not illustrated in the drawing), which preservers the identification information of the guard who is a wearer or a possessor, and authentication device CR.

Authentication device CR as an example of the code detection device is installed in each place of the monitoring area. In a case where authentication device CR receives a signal transmitted from authenticated terminal RC, which is installed on or maintained by the guard, and authenticates whether or not the terminal is a proper authenticated terminal, it is possible to detect a fact that a properly authenticated terminal passes through the installation place of authentication device CR. The authentication device CR is, for example, a card reader that is disposed in the vicinity of a door of an entrance and exit, and authenticates that a guard who possesses the card as an example of the authenticated terminal RC passes through the door. Authentication device CR preserves the positional information of the guard in positional information management server 21.

For example, color barcode CM as an example of a code is guard identification information which is printed on the uniform or a name tag of the guard who patrols the monitoring area or traces the suspect, and in which a plurality of color patterns that are different from for respective color barcodes CM are prescribed. For example, it is possible to use a chameleon code (registered trademark) as an example of color barcode CM. Color barcode CM is detected through an image process performed by any one of cameras 11-1 to 11-n, which is an example of the code detection device that captures the monitoring area. The camera transmits the detected color barcode CM to any authentication device CR. For example, authentication device CR as a transmission destination of the color barcode CM from the camera is an authentication device which is previously associated with the camera that detected color barcode CM one by one. For example, the camera is associated with an authentication device which is installed in the closest position to the camera one by one. Authentication device CR authenticates the color barcode CM, which is transmitted from the camera, and authenticates whether or not the guard is previously associated with the color barcode CM with reference to guard information management server 22. In a case where the authentication is successful, authentication device CR preserves positional information of the camera, which detects color barcode CM, as the positional information of the guard in positional information management server 21.

Positional information management server 21 includes a computer (for example, PC), and performs a process for preserving the positional information of the guard, which is output from BLE reception device BR or authentication device CR, in association with guard information in a case where the processor and the memory cooperates with each other according to the predetermined computer program for a server. In a case where a request from security report print processor 142 exists, positional information management server 21 outputs the positional information of the guard to security report print processor 142 in response.

Guard information management server 22 includes a computer (for example, PC), and performs a process for preserving the pieces of guard information (for example, guard identification information, a guard name, and color barcode CM assigned to individual guard) in a case where the processor and the memory cooperates with each other according to the predetermined computer program for a server. In a case where a request from security report print processor 142 exists, guard information management server 22 outputs the guard information to security report print processor 142 in response.

Figure 2:
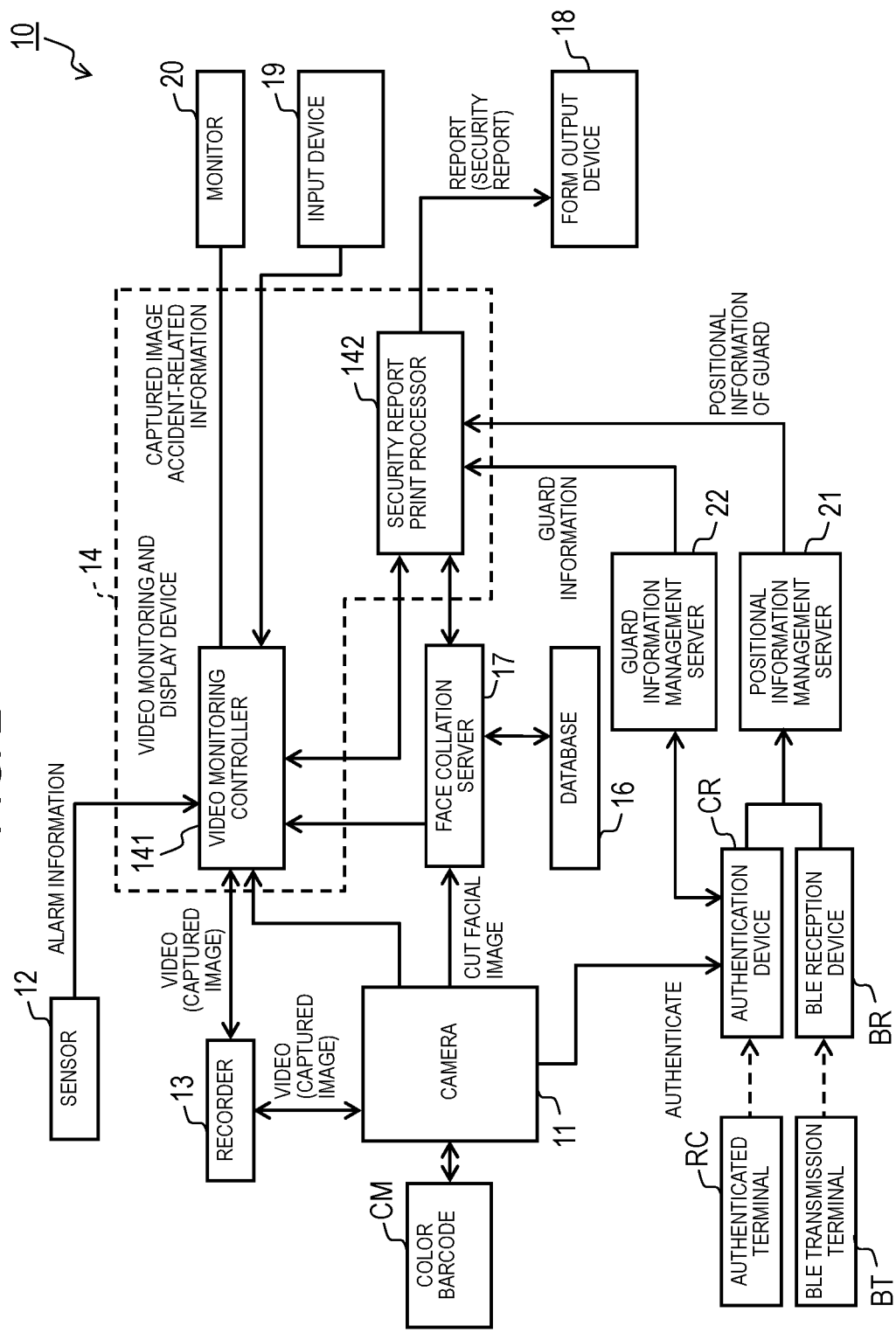
FIG. 2 is a block diagram illustrating an example of a functional configuration of the security system according to the embodiment.

FIG. 2 is a block diagram illustrating an example of a functional configuration of security system 10 according to the embodiment. Video monitoring and display device 14 includes video monitoring controller 141 that performs a process related to display output of the captured images and accident-related information to monitor 20, and security report print processor 142 that performs a process related to generation of a report as a security report, which includes the captured images and the accident-related information, and print out of the report to form output device 18.

The camera photographing video captured by camera 11 is transmitted to video monitoring controller 141 of video monitoring and display device 14 and face collation server 17, and transmitted to and stored in recorder 13. In addition, camera 11 is capable of transmitting current camera photographing video (in other words, live video), which is being captured, to monitor 20 in real time via video monitoring and display device 14, and displaying the camera photographing video on monitor 20.

Camera photographing images (captured images), which are the moving image or the still images stored in recorder 13, are transmitted to video monitoring controller 141. In addition, recorder 13 is capable of transmitting the captured images stored to monitor 20 via video monitoring and display device 14 and displaying the captured images on monitor 20.

Face collation server 17, which has a function as a face collation processor, inputs the camera photographing video captured by camera 11, detects a face of a person included in the captured images, extracts facial feature metadata and a facial image of the detected face, and outputs the extracted facial feature metadata and the facial image to database 16.

Database 16, which has a function as a facial information preservation unit, preservers the facial information including the facial feature metadata and the facial image which are transmitted from face collation server 17. In addition, face collation server 17 collates whether the facial image in the captured images, which are being captured by camera 11, is a facial image of the same person using the facial image and the facial feature metadata which are preserved in database 16.

In a case where occurrence of an accident, such as robbery, is detected as the predetermined matter by sensor 12, the alarm information, which is output from sensor 12, is input to video monitoring controller 141. For example, alarm information includes a detection signal of the shoplifting preventing gate installed in the vicinity of an exit of a store, a release signal of a door in a case of entering and leaving from a predetermined area using a card reader or the like, and a detection signal of the touch sensor installed in a fence around a site of the store. In addition, it is possible to generate the detection information using camera 11 as sensor 12 in a case where a person is detected in the captured images in a place where a person does not intrude normally.

In a case where the alarm information which informs the occurrence of the accident is input, video monitoring controller 141 sets a facial image of a suspect or a guard based on captured images according to operation input of input device 19 performed by the guard who is the user. Face collation server 17 searches whether or not the same facial image as the facial image of the suspect or the guard set by video monitoring controller 141 is captured in the captured images recorded in recorder 13, and extracts the captured images which include the same facial image of the suspect or the guard.

Meanwhile, in addition to the alarm information from sensor 12, it is possible to detect the occurrence of an accident in such a way that the guard views the camera photographing video of the live video using monitor 20, checks occurrence of the accident from suspicious motion or the like, and performs the operation input of input device 19.

Video monitoring controller 141 causes monitor 20 to display the extracted captured images including the suspect or the guard. In addition, video monitoring controller 141 inputs a memo about the suspect related to the captured images and the accident or the accident-related information as a memo about the guard, the accident, or the like according to the operation input of input device 19 performed by the user, and stores the memo or the accident-related information in a memory (not illustrated in the drawing) of video monitoring and display device 14, database 16, or recorder 13. In addition, video monitoring controller 141 generates various display screens, which include the captured images and the accident-related information, according to the operation input of input device 19 performed by the user, and causes the monitor 20 to display the various display screens.

Security report print processor 142 outputs a request to positional information management server 21 and guard information management server 22 according to the operation input of input device 19 performed by the user, generates the security report, which includes the selected captured image for generating a report and the accident-related information, using responses from positional information management server 21 and guard information management server 22, and outputs the security report to form output device 18. Form output device 18 prints out the security report (report) generated by security report print processor 142.

[Operation of Security System]

Figure 3:
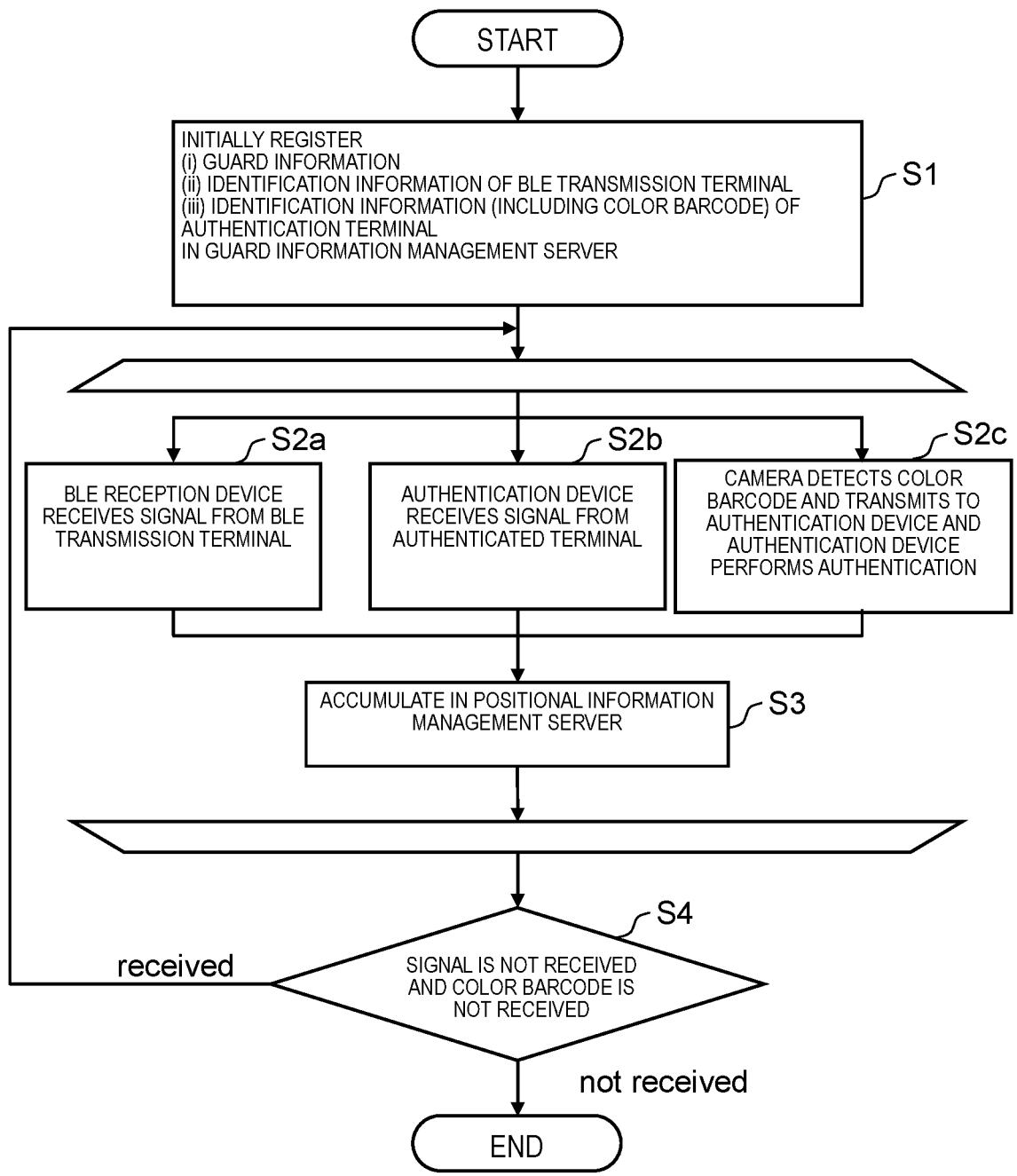
FIG. 3 is a flowchart illustrating an example of a procedure of an operation of acquiring positional information of a guard in the security system according to the embodiment.

FIG. 3 is a flowchart illustrating an example of a procedure of an operation of acquiring the positional information of the guard in security system 10 according to the embodiment. In FIG. 3, first, the guard information, the identification information of BLE transmission terminal BT acquired in a case where the guard installs or possesses BLE transmission terminal BT, and authenticated terminal RC acquired in a case where the guard installs or possesses authenticated terminal RC (including color barcode CM) are initially registered in guard information management server 22 according to the operation input of input device 19 performed by the user (step S1). Meanwhile, in step S1, information relevant to an installation position of authentication device CR installed in the monitoring area and information relevant to an installation position of BLE reception device BR may be registered in guard information management server 22.

Subsequent to step S1, any one of steps S2a, S2b and S2c is performed. That is, in the case where the guard installs or possesses BLE transmission terminal BT, BLE reception device BR receives a signal from BLE transmission terminal BT (step S2a). In the case where the guard installs or possesses authenticated terminal RC, authentication device CR receives a signal from authenticated terminal RC (step S2b). In a case where the guard installs or possesses color barcode CM, authentication device CR authenticates whether or not the color barcode detected by camera 11 coincides with the color barcode which is initially registered in step S1 (step S2c).

Subsequent to step S2a, S2b, or S2c, positional information management server 21 preserves and accumulates the positional information of the guard output from BLE reception device BR or authentication device CR (step S3). Subsequent to step S3, in a case where the signals are not received from BLE transmission terminal BT and authenticated terminal RC and, furthermore, the color barcode which should be transmitted from camera 11 is not received in authentication device CR (step S4, not received), the process illustrated in FIG. 3 ends. In contrast, in a case where the signal from BLE transmission terminal BT or authenticated terminal RC is received or the color barcode which is transmitted from camera 11 is received in authentication device CR (step S4, received), the process illustrated in FIG. 3 proceeds to any one of steps S2a, S2b, and S2c, and accumulation of the positional information of the guard in positional information management server 21 is continued.

Figure 4:
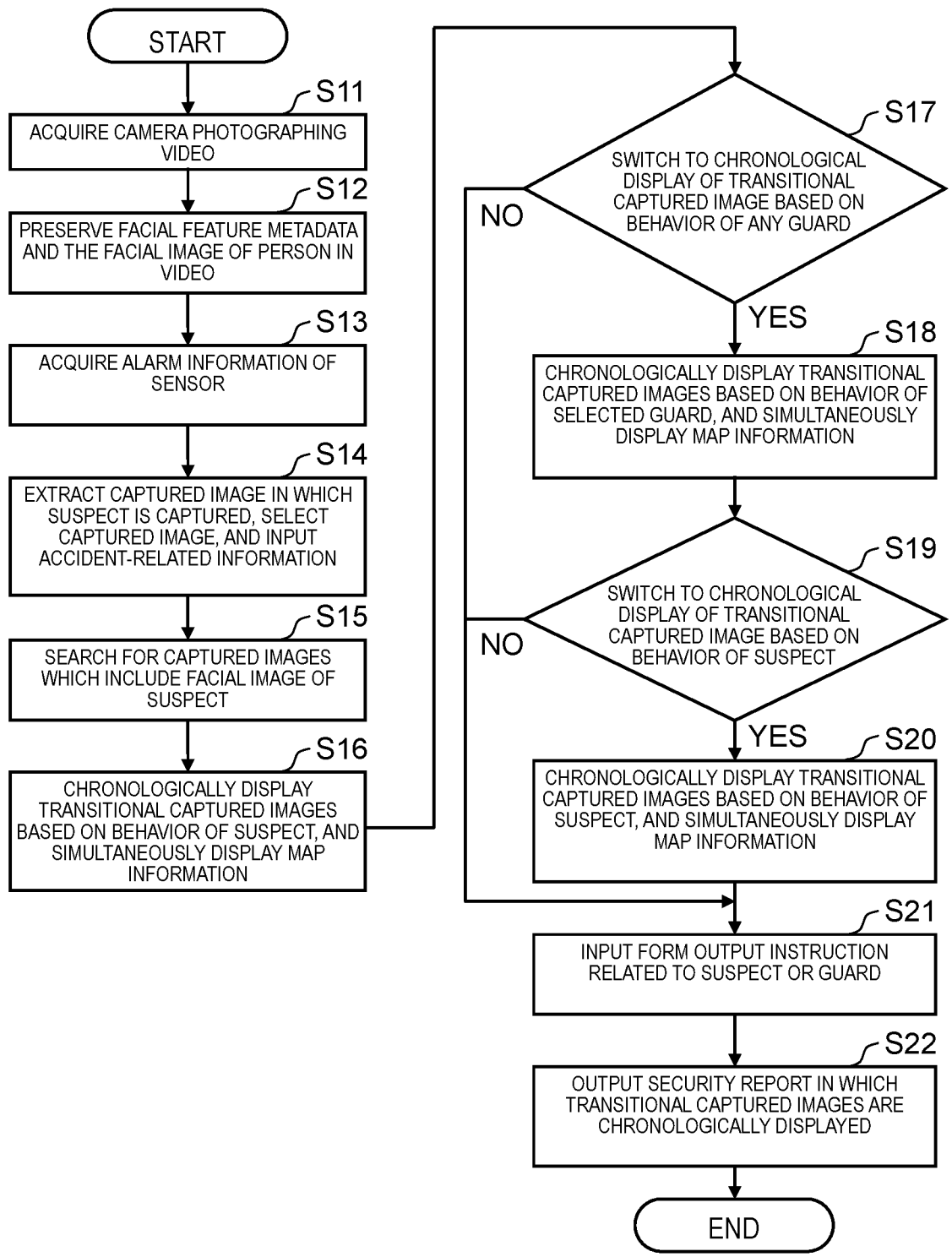
FIG. 4 is a flowchart illustrating an example of a main operation in the security system according to the embodiment.

FIG. 4 is a flowchart illustrating a main operation in security system 10 according to the embodiment. In the monitoring area, camera 11 continuously photographs the monitoring area of each installation place, and recorder 13 stores the camera photographing video photographed by camera 11. Here, video monitoring and display device 14 is capable of acquiring the camera photographing video from camera 11 and recorder 13. In addition, the process for accumulating the positional information of the guard illustrated in FIG. 3 may be performed at any timing of the process illustrated in FIG. 4.

In FIG. 4, first, face collation server 17 receives and acquires the camera photographing video photographed by camera 11 (step S11). Face collation server 17 detects a face of a person in the video from the camera photographing video, outputs the facial feature metadata which shows the feature of the face and a facial image to database 16, and causes the database 16 to preserve the facial feature metadata and the facial image (step S12).

In a case where the accident, such as robbery, occurs in a store where security system 10 according to the embodiment is disposed, video monitoring and display device 14 receives and acquires the alarm information from sensor 12 (step S13). In a case where the alarm information is received, video monitoring and display device 14 may inform the occurrence of the accident by causing monitor 20 to display the alarm information.

With reception of the alarm information, video monitoring and display device 14 performs a process in a case where the accident occurs. That is, video monitoring and display device 14 extracts the captured images, in which the suspect or the guard who traces the suspect is captured, from the captured images stored in recorder 13, and inputs the accident-related information (step S14). Here, video monitoring and display device 14 selects the captured images, in which the suspect or the guard is captured, according to the operation input of input device 19 performed by the guard who is the user, and inputs the accident-related information corresponding to the captured images of the suspect or the guard.

In a case where the captured images, in which the suspect or the guard is captured, are selected, for example, video monitoring and display device 14 reads the captured images just before a point of time in which the accident stored in recorder 13 is generated (a point of time in which alarm information is received), displays the read captured images on monitor 20, and selects captured images corresponding to 30 frames as candidate images in which the suspect or the guard is captured. Furthermore, video monitoring and display device 14 performs frame-by-frame playback on the candidate images according to the operation input of input device 19 performed by the user, and thus the guard designates and selects captured imaged at an angle which is easy to know the features of the face of the suspect among the candidate images. Here, areas including the facial images of the suspect or the guard in the captured images may be trimmed and enlarged.

Face collation server 17 extracts the facial feature metadata and the facial images of the suspect or the guard in relation to the captured images, in which the suspect or the guard is captured, so as to output to and preserve in database 16 so as to cause the database 16. In this case, face collation server 17 acquires the facial feature metadata and the facial image based on the captured images at the angle which is easy to know the features of the face of the suspect or the guard selected by video monitoring and display device 14 as above. Furthermore, face collation server 17 collates the facial images in the captured images with the facial image of the suspect or the guard for the captured images stored in recorder 13 up to the present, and searches for the captured images which include the facial image of the suspect or the guard (step S15). Therefore, face collation server 17 is capable of extracting the captured images, in which the suspect or the guard is captured, in different times and places from before the accident occurs until after the accident occurs.

In a case where the captured images in which the suspect is captured are extracted, face collation server 17 is capable of detecting the suspect by reading the color barcode among the captured images. For example, in a store where it is general that an attendance maintains a shopping cart, a shopping basket, a shopping bag, or the like in the store, a color barcode is attached to equipment in the hall under environments in which it is possible to associate a specific attendance with equipment in the hall, such as the shopping cart, and thus face collation server 17 is capable of tracing a specific person by detecting the color barcode from captured images of each monitoring area in the store. In this case, face collation server 17 performs face collation and color barcode detection processes, links the facial image of the suspect to a color barcode which exists together in a fixed range, and traces and detects a relevant color barcode. Therefore, it is possible to extract the captured images, in which the suspect is captured, using the captured images in which the specific color barcode is detected. For example, a two-dimensional barcode or the like may be appropriately used as the color barcode. It is apparent that the above-described chameleon code (registered trademark) may be used as the color barcode.

Subsequently, video monitoring and display device 14 chronologically displays transitional captured images based on behavior of the suspect on monitor 20 using the extracted captured images of the suspect until the accident occurs. In addition, video monitoring and display device 14 simultaneously displays the transitional captured images and map information image 52, which shows a position where each captured image is photographed, on monitor 20 (step S16). In the description below, the transitional captured images are captured images, in which a plurality of captured images of the same suspect or the guard in different time and places are chronologically arranged and disposed together with elapsed time, based on behavior of the suspect or the guard before and after regular time from time in which the accident reacted by sensor 12 occurs.

In a case where an operation for switching a screen, in which transitional captured images (for example, the transitional captured images of the suspect) displayed in step S16 and map information image 52 are displayed, to chronological display of the transitional captured images based on any behavior of the guard is input by input device 19 (step S17, YES), video monitoring and display device 14 simultaneously display the transitional captured images based on the behavior of the selected guard and map information image 52, which shows the position where each of the captured images is photographed, on monitor 20 (step S18). In contrast, in a case where the operation for switching to the chronological display of the transitional captured images based on behavior of any guard is not performed (step S17, NO), the process illustrated in FIG. 4 proceeds to step S21.

In addition, in a case where an operation for switching to chronological display of the transitional captured images based on the behavior of the suspect is input by input device 19 with respect to the screen on which the transitional captured images (for example, transitional captured images of the guard) displayed in step S18 and map information image 52 are displayed (step S19, YES), video monitoring and display device 14 simultaneously display the transitional captured images based on the behavior of the selected suspect and map information image 52 which shows the position where each of the captured images is photographed on monitor 20 (step S20). In contrast, in a case where the operation for switching to the chronological display of the transitional captured images based on the behavior of the suspect is not performed (step S19, NO), the process illustrated in FIG. 4 proceeds to step S21.

Video monitoring and display device 14 inputs an document output instruction according to the operation input of input device 19, such as pressing of a document output button by the guard or another user (step S21). Based on the document output instruction, video monitoring and display device 14 generates the security report in which the transitional captured images are chronologically displayed, and prints out a document corresponding to the security report from form output device 18 (step S22). The security report is displayed with the accident-related information in association with the transitional captured images. Meanwhile, document data of the security report may be output to another device, such as the monitoring center of the security contract company which is provided on the outside, from form output device 18 via the network.

[Detailed Operation of Each Process]

Display of Captured Image and Map Information

FIG. 5 is a diagram illustrating an example of the transitional captured image display screen on which the transitional captured images based on the captured images of the suspect and map information of the monitoring area are displayed. The transitional captured image display screen 51 illustrated in FIG. 5 is displayed on monitor 20 according to a process performed by video monitoring and display device 14. For example, in transitional captured image display screen 51, a plurality of captured images, in which the suspect is captured, are chronologically disposed in a line along an edge of a lower end of the screen. Transitional captured images 53 which show behavior history of the suspect are formed using the captured images which are chronologically disposed. On an upper side of transitional captured images 53 in transitional captured image display screen 51, map information image 52 which shows captured positions of the respective captured images in the monitoring area are disposed. In map information image 52, layouts of stores which are monitoring targets of security system 10 are illustrated using a map, and thus it is possible to display the captured positions of the captured images of respective monitoring areas on the map based on the disposition of each camera 11.

For example, in a case where the user manipulates input device 19 to locate (for example, mouse over) mouse pointer 55 on specific captured image 53a among transitional captured images 53 on transitional captured image display screen 51, captured position mark 56 corresponding to specific captured image 53a and captured attachment information 57 of the captured image are displayed. Captured position mark 56 is displayed as a mark, such as a circle, which indicates a position, on map information image 52. In captured attachment information 57, a name (for example, west entrance), a photographed date (YYYY/MM/DD), photographed time (hh/mm/ss), and the like of the captured position (an installation position of camera 11) corresponding to captured position mark 56 are displayed. In addition, in a case where mouse pointer 55 is sequentially positioned on other captured images of transitional captured images 53, video monitoring and display device 14 displays captured position mark 56 and captured attachment information 57 according to transition of mouse pointer 55 in a switching manner, and displays the captured position corresponding to a designated captured image and captured positional information (for example, see west entrance jewelry store miscellaneous goods→noodle at the bottom of FIG. 5).

Figure 6:
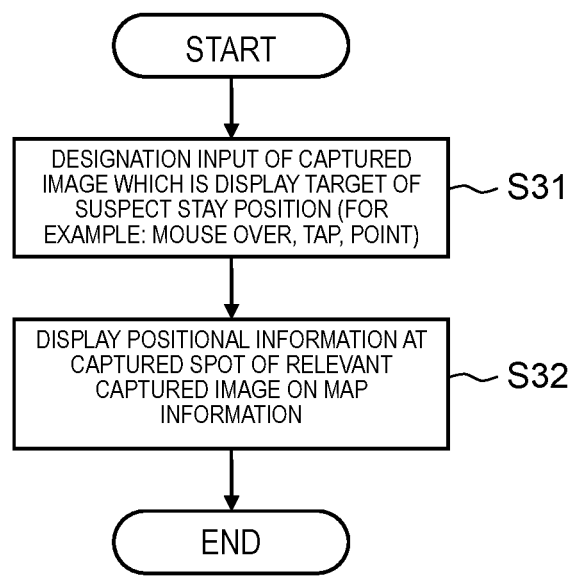
FIG. 6 is a flowchart illustrating an example of a procedure of displaying captured positional information of the captured image designated in the transitional captured image display screen illustrated in FIG. 5.

FIG. 6 is a flowchart illustrating a procedure of displaying captured positional information of the captured image designated on transitional captured image display screen 51 illustrated in FIG. 5. In FIG. 6, in a case where transitional captured image display screen 51 is displayed, video monitoring and display device 14 receives designation input of the captured image which is a display target of a suspect staying position according to an instruction (for example, mouse over, tap, or point) of mouse pointer 55 according to the operation input of input device 19 performed by the user (step S31). In this case, among the plurality of captured images included in transitional captured images 53, any captured image 53a, which is a display target of positional information (in other words, positional information of the suspect) of camera 11 that captures the suspect, is designated by, for example, mouse pointer 55 which has a shape of a finger of a person.

Video monitoring and display device 14 displays captured position mark 56 on map information image 52 as positional information of a captured spot of designated captured image 53a, and displays captured attachment information 57 corresponding to captured position mark 56 (step S32).

Display of Switching Between Transitional Captured Images of Suspect and Transitional Captured Images of Guard FIG. 7 is a diagram illustrating a switching example from transitional captured image display screen 51 illustrated in FIG. 5 to a transitional captured image display screen on which the transitional captured images are displayed based on the positional information of the guard. In transitional captured image display screen 51 illustrated on a top of FIG. 7, transitional captured images 53 based on the behavior of the suspect are illustrated similar to transitional captured image display screen 51 illustrated in FIG. 5. In a case where switching selection button 54k is designated in such a way that the user manipulates input device 19 with respect to transitional captured image display screen 51 illustrated on the top of FIG. 7, selection screen SEL for switching the captured target of the transitional captured images is displayed at a center of transitional captured image display screen 51. Subsequently, in a case where any guard (for example, guard A) is selected with respect to switching selection screen SEL, video monitoring and display device 14 generates a transitional captured image based on behavior of selected guard (for example, guard A), and displays transitional captured image display screen 51, in which transitional captured images 53 of the suspect are switched to transitional captured images 53k of the guard (for example, guard A), on monitor 20 as illustrated at a bottom of FIG. 7.

Meanwhile, in transitional captured image display screen 51 illustrated at the bottom of FIG. 7, in addition to captured image 53a of individual guard, a marker (for example, card reader marker MK1), which shows authenticated terminal RC which is installed on or possessed by the guard and authentication device CR in a case where color barcode CM is authenticated, and a marker (for example, BLE marker MK2) which indicates BLE reception device BR in a case where a signal is received from BLE transmission terminal BT, may be displayed to cut into chronological transitional captured images 53k in the transitional captured images 53k of the guard. For example, in transitional captured images 53k illustrated at the bottom of FIG. 7, card reader marker MK1, which shows authentication device CR (for example, card reader), is illustrated subsequent to captured time of a third captured image and previous to captured time of a fifth captured image from a left end of sheet, in a case where the guard (for example, guard A) installs or possess authenticated terminal RC (for example, a card), and is illustrated at a fourth captured image from the left end of the sheet in a case where authentication device CR (for example, a card reader) authenticates authenticated terminal RC. In addition, for example, in transitional captured images 53k illustrated at the bottom of FIG. 7, BLE marker MK2, which shows BLE reception device is shown subsequent to captured time of a fifth captured image from the left end of the sheet and previous to captured time of a seventh captured image in a case where the guard (for example, guard A) installs or possesses BLE transmission terminal BT, and is shown at a sixth captured image from the left end of the sheet in a case where BLE reception device BR receives a signal from BLE transmission terminal BT.

Meanwhile, although FIG. 7 illustrates an example in which transitional captured images 53 of the suspect are switched to transitional captured images 53k of the guard, display may be performed in a reverse direction thereof, that is, transitional captured images 53k of the guard may be switched to transitional captured images 53 of the suspect.

Figure 8:
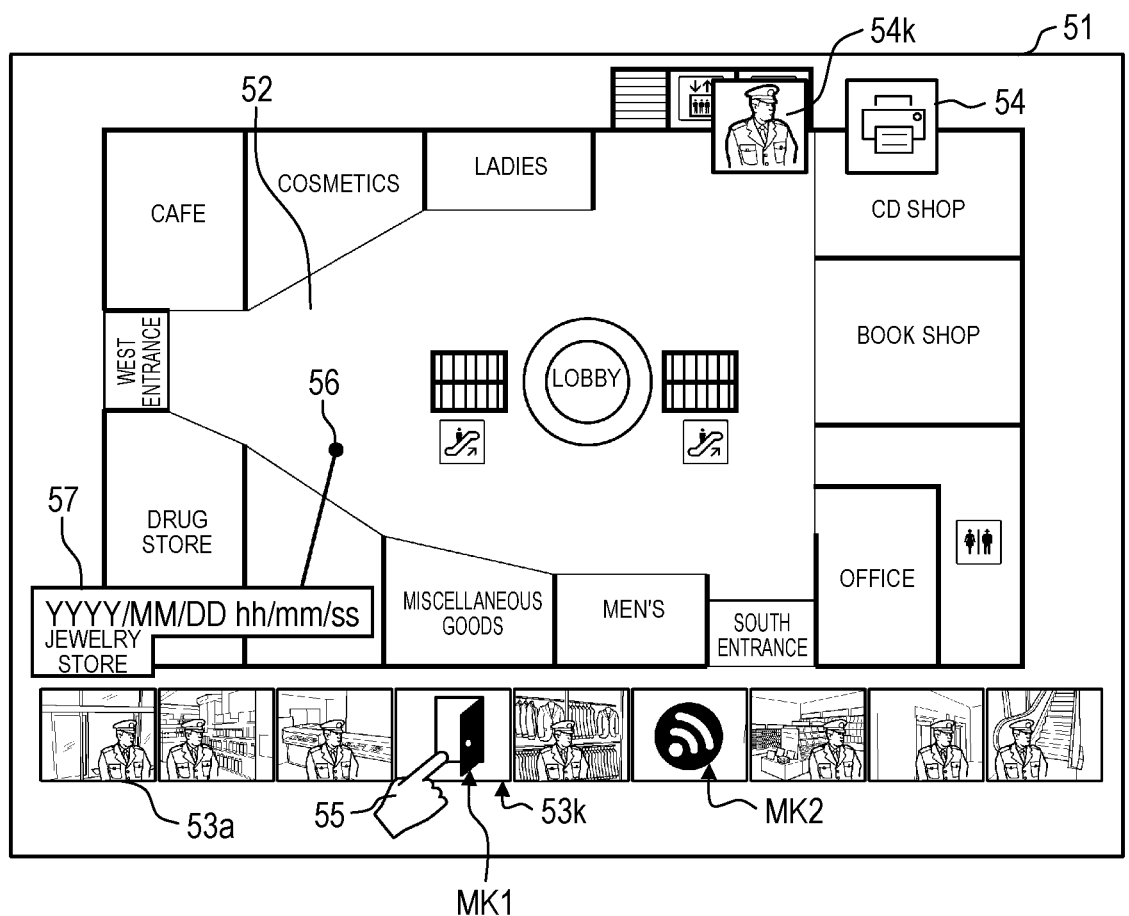
FIG. 8 is a diagram illustrating an example which shows the positional information of the guard in a case where a card reader marker is moused over.

FIG. 8 is a diagram illustrating an example which shows the positional information of the guard in a case where card reader marker MK1 is moused over. In a case where mouse pointer 55 is moused over card reader marker MK1 in such a way that the user manipulates input device 19 in transitional captured image display screen 51 illustrated in FIG. 8, video monitoring and display device 14 displays an installation position (for example, in the vicinity of an entrance of the jewelry shop in FIG. 8) of authentication device CR corresponding to card reader marker MK1, which is a mouse-over target, and time in which authentication device CR authenticates authenticated terminal RC as captured attachment information 57 with reference to positional information management server 21 and guard information management server 22.

Figure 9:
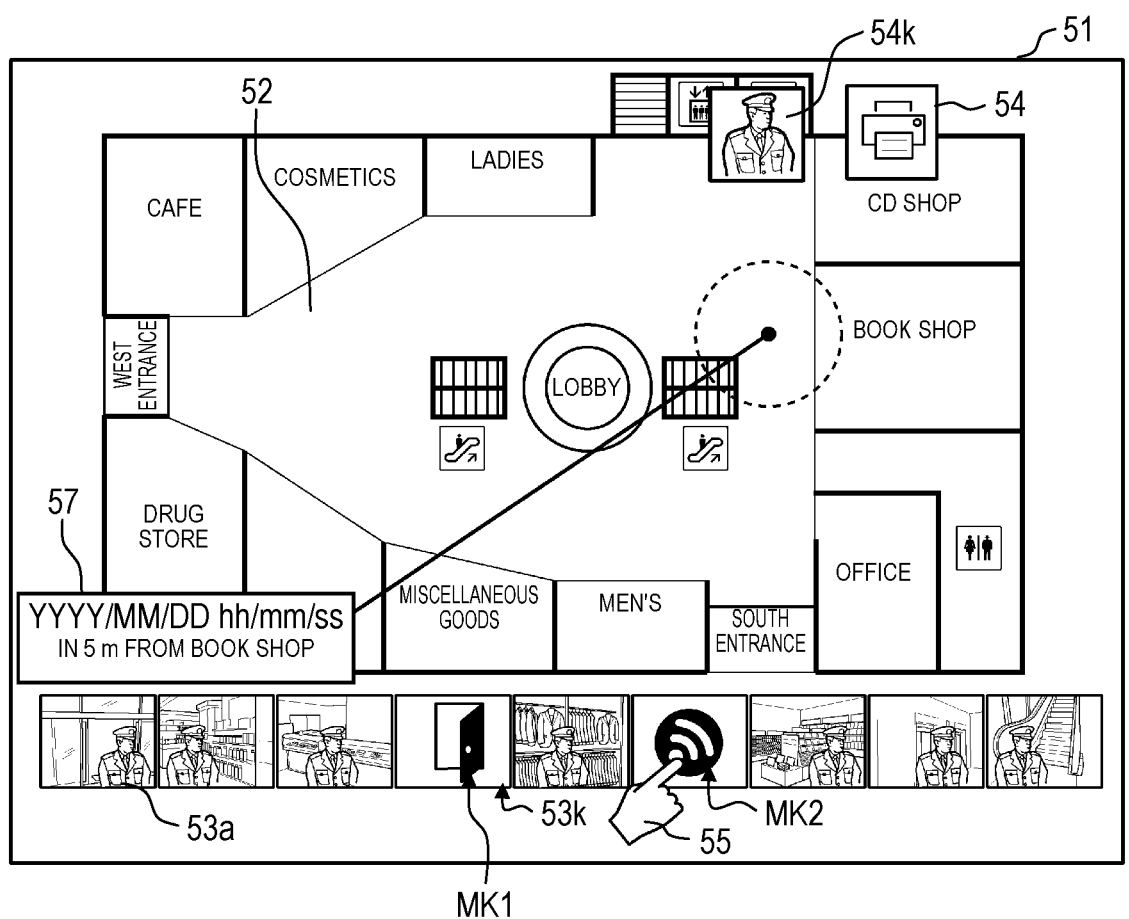
FIG. 9 is a diagram illustrating an example which shows positional range information of the guard in a case where a BLE marker is moused over.

FIG. 9 is a diagram illustrating an example of position range information of the guard in a case where BLE marker is moused over. In a case where the mouse pointer 55 is moused over BLE marker MK2 in such a way that the user manipulates input device 19 in transitional captured image display screen 51 illustrated in FIG. 9, video monitoring and display device 14 displays a range of a transmission source (for example, in FIG. 9, a range corresponding to a radius of approximately 10 m centering on the vicinity of an entrance of a book store which is an installation position of the BLE reception device, see a dotted line in the drawing) of the signal received from BLE transmission terminal by BLE reception device BR corresponding to BLE marker MK2, which is a mouse-over target, and time in which BLE reception device BR receives the signal from BLE transmission terminal BT, as captured attachment information 57 with reference to positional information management server 21 and guard information management server 22.

Enlargement Display of Captured Image

FIG. 10 is a diagram illustrating an example of a reproduction screen of a moving image corresponding to a captured image in a case where any one of the captured images is clicked on the transitional captured image display screen illustrated in FIG. 5. In a case where the user manipulates input device 19 and designates (for example, clicks) any captured image 53b among transitional captured images 53 using mouse pointer 55 in transitional captured image display screen 51 illustrated on the top of FIG. 10, captured image enlargement display screen 61 illustrated at the bottom of FIG. 10 is displayed, and video reproduction screen 62 is displayed such that video corresponding to fixed time, during which captured image 53b is captured, is reproduced through enlargement display. Video reproduction screen 62 is provided with a reproduction button, a stop button, a forward button, a rewind button, and the like, reproduction of a moving image of the captured image is performed in a state of the enlargement display according to a user's operation instruction using input device 19. Captured image enlargement display screen 61 is provided with map information display button 63 for returning to transitional captured image display screen 51 which includes display of original map information.

It is possible to select a desired captured image of a still image in video reproduction screen 62 of captured image enlargement display screen 61, for example, in such a way that the user temporarily stops at a frame in which it is further easy to recognize the feature of the suspect, such as an image in which the suspect faces the front, while the user reproduces and visually recognizes the moving image of the captured image. That is, it is possible to select a captured image in a proper frame and to extract the captured image as the captured image of the still image from the captured images of the moving image which has a plurality of frames. In this case, in a case of returning to original transitional captured image display screen 51 by manipulating map information display button 63, video monitoring and display device 14 forcibly stops reproduction of the moving image corresponding to captured image 53b by manipulating map information display button 63, and displays a still image of a frame at a point of time, in which the reproduction stops, as relevant captured image 53b of transitional captured images 53. In a case where the user browses video reproduction screen 62, it is possible to check detailed content in detail through the enlargement display of the captured image, and it is possible to easily determine an output image frame of the captured image in a case of being output as a security report (report) which will be described later.

Figure 11:
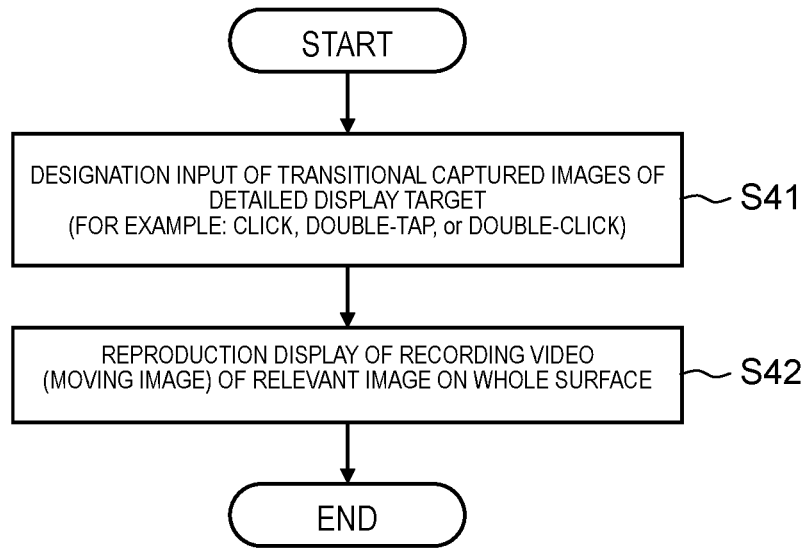
FIG. 11 is a flowchart illustrating an example of a procedure of reproducing the moving image illustrated in FIG. 10.

FIG. 11 is a flowchart illustrating an example of a procedure of reproducing the moving image illustrated in FIG. 10. In FIG. 11, in a case where transitional captured image display screen 51 is displayed, video monitoring and display device 14 receives an enlargement display instruction input of any captured image, which is an enlargement display target among transitional captured images 53, according to an instruction (for example, click, double-tap, or double-click) of mouse pointer 55, and the like according to the operation input of input device 19 performed by the user (step S41). In this case, captured image 53b, which is a reproduction target of the moving image in a regular period before and after the captured image is captured, is designated among the plurality of captured images included in transitional captured images 53 using, for example, mouse pointer 55 which has a shape of a finger of a person.

Video monitoring and display device 14 reads data of the captured image in the regular period before and after the designated captured image 53b is captured from recorder 13, and displays captured image enlargement display screen 61 of captured image 53b on monitor 20. Video monitoring and display device 14 reproduces and displays a recorded video of the moving image of captured image 53b on a whole surface of a display area of monitor 20 using video reproduction screen 62 of captured image enlargement display screen 61 (step S42).

Input of Accident-Related Information

Figure 12:
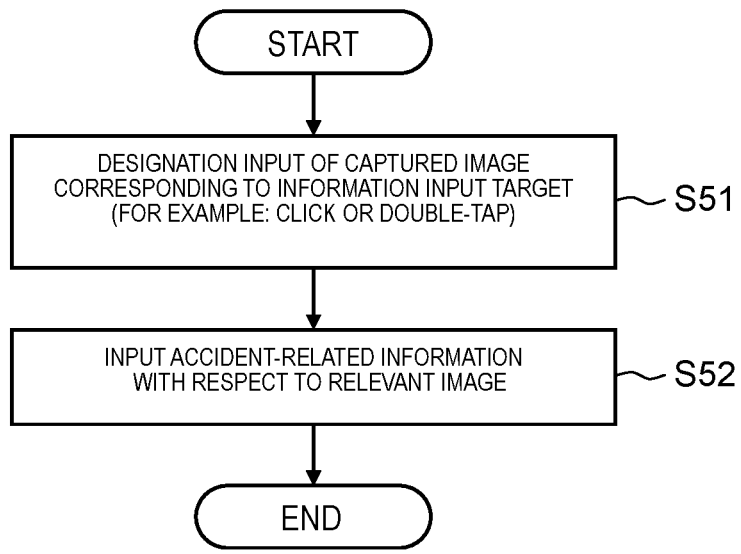
FIG. 12 is a flowchart illustrating an example of a procedure of inputting accident-related information corresponding to any one of the captured images included in the transitional captured images based on the captured images of the suspect or the guard.

FIG. 12 is a flowchart illustrating an example of a procedure of inputting the accident-related information with respect to any captured image included in the transitional captured images based on the captured images of the suspect or the guard. In FIG. 12, in a case where video monitoring and display device 14 acquires alarm information output from sensor 12, the video monitoring and display device 14 receives designation input of the captured image of an information input target through, for example, click of a mouse, double tab of a touch panel, and the like as a process performed in a case where an accident occurs according to the operation input of input device 19 performed by the guard who is the user (step S51). For example, in a state in which video monitoring and display device 14 displays the captured image acquired just before the point of time, in which the accident occurred, stored in recorder 13 on monitor 20, captured images, in which the suspect is captured, are selected by visual decision of the guard, and a captured image used to input the accident-related information is designated through the operation input performed by the guard. Video monitoring and display device 14 inputs designation of the captured image which is an input target of the accident-related information.

Video monitoring and display device 14 inputs the accident-related information corresponding to the captured images in which the suspect corresponding to the designation input is captured (step S52). Meanwhile, in the accident-related information, the captured information including at least one of the captured position, in which the captured image is captured, and the photograph time may be automatically input after video monitoring and display device 14 acquires the captured information from camera 11 or recorder 13.

For example, the guard manipulates the keyboard of input device 19 and input a type of the alarm information, the feature information of the suspect, or the like as the accident-related information.

The accident-related information is stored in a memory of video monitoring and display device 14, database 16, or recorder 13. An example of the accident-related information is described below.

[common name-title] common name ABCDE

[alarm information: source of occurrence] from shoplifting preventing gate A

[alarm information: occurrence time] Jul. 20, 2015 20:15:40

[age] looks around the age of 35

[gender] looks like a man

[height] looks around 160 cm (because higher than the shoplifting preventing gate by approximately 10 cm)

[note] frequently prowls around a parking lot

Output Selection to Security Report of Captured Image

Figure 13:
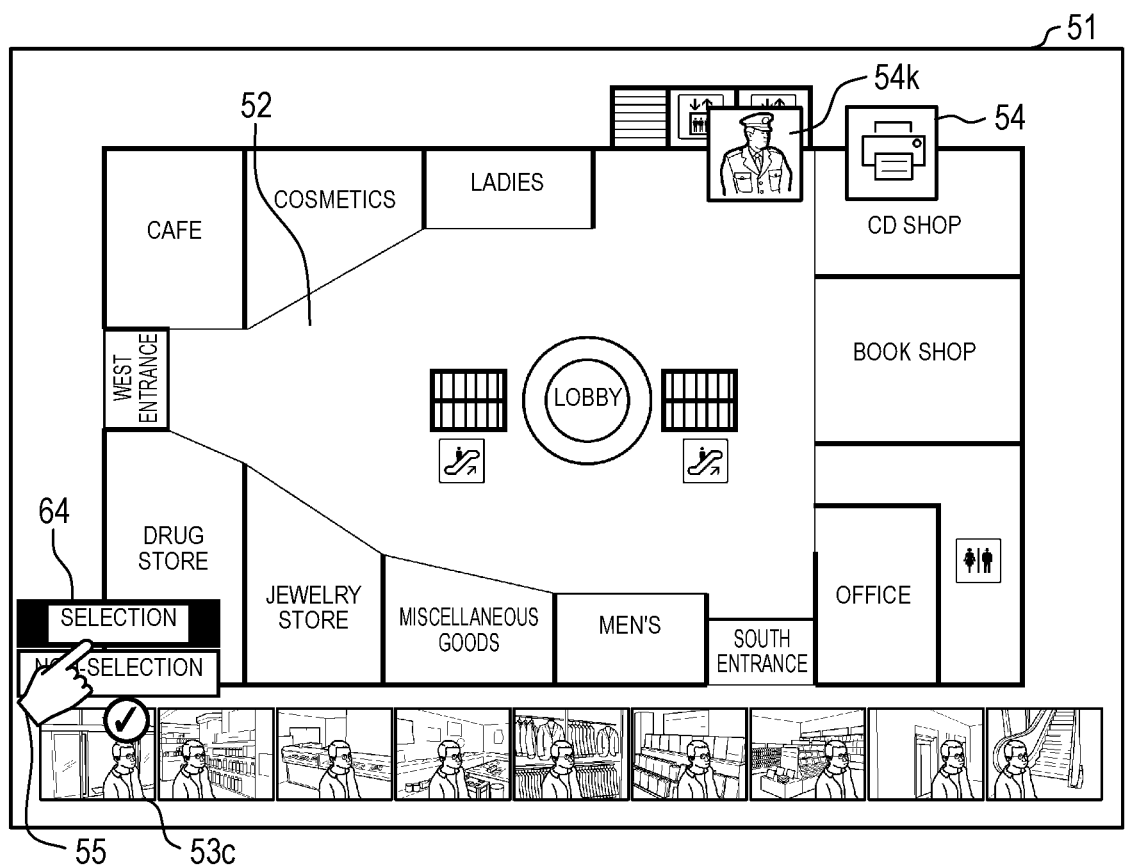
FIG. 13 is a diagram illustrating an example of selecting the captured images which are output as the security report in the transitional captured image display screen illustrated in FIG. 5.

FIG. 13 is a diagram illustrating an example of selecting the captured images which are output as the security report in the transitional captured image display screen 51 illustrated in FIG. 5. As illustrated in FIG. 13, in a case where the user manipulates input device 19 and any captured image 53c is designated (for example, right-click) among transitional captured images 53 using mouse pointer 55 in transitional captured image display screen 51 illustrated in FIG. 5, video monitoring and display device 14 displays an image selection menu in the vicinity of a display position of designated captured image 53c. In a case where the image selection menu is displayed and a drag operation is performed on an image selection menu using mouse pointer 55 and selection 64 of menu items is designated, video monitoring and display device 14 selects captured image 53c of a display source of the image selection menu as an output target of the security report. Video monitoring and display device 14 gives check mark CK (see FIG. 19) to selected captured image 53c, and displays selected captured image 53c.

Figure 14:
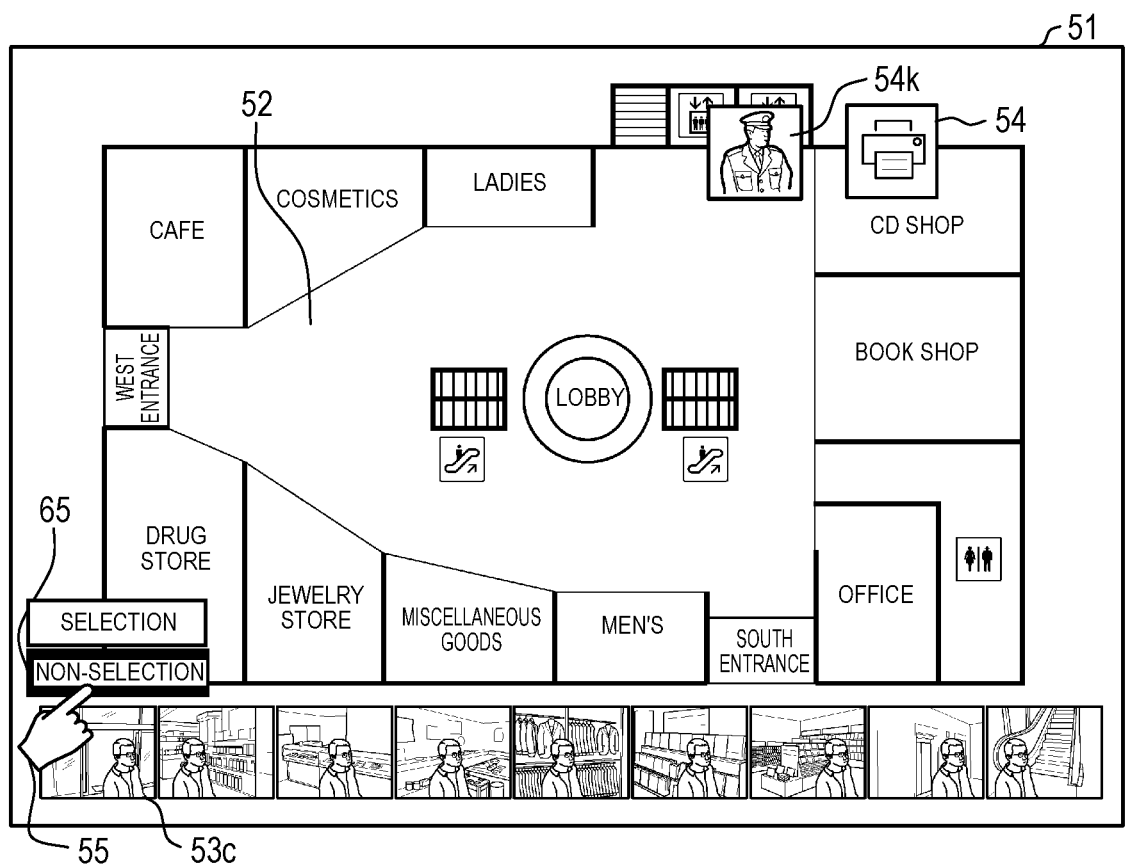
FIG. 14 is a diagram illustrating an example of non-selecting the captured images which are output as the security report in transitional captured image display screen illustrated in FIG. 5.

FIG. 14 is a diagram illustrating an example of non-selecting the captured images which are output as the security report in transitional captured image display screen 51 illustrated in FIG. 5. As illustrated in FIG. 14, in a case where drag operation is performed on the image selection menu using mouse pointer 55 and non-selection 65 is designated in a state in which any captured image 53c is selected as the output target of the security report through a right-click operation of mouse pointer 55 in transitional captured image display screen 51 illustrated in FIG. 5, video monitoring and display device 14 releases selection as the output target of the security report of captured image 53c, and excludes the captured image from the output target of the security report. Due to the exclusion, video monitoring and display device 14 does not display check mark CK with respect to the captured image in which selection as the output target of the security report is released.

Figure 15:
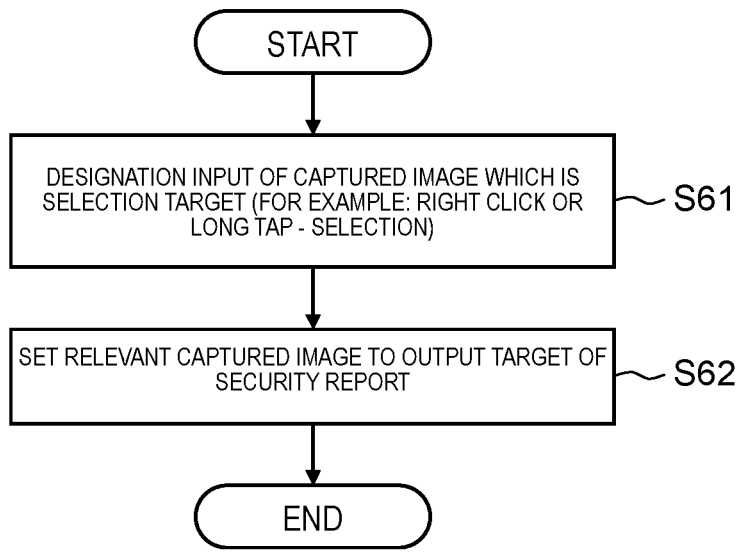
FIG. 15 is a flowchart illustrating an example of a selection procedure of selecting a target of the captured images which are output as the security report in transitional captured image display screen illustrated in FIG. 5.

FIG. 15 is a flowchart illustrating an example of a procedure of selecting a target of the captured images which are output as the security report in transitional captured image display screen 51 illustrated in FIG. 5. In FIG. 15, in a case where transitional captured image display screen 51 illustrated in FIG. 5 is displayed, video monitoring and display device 14 receives the designation input of the captured image for selection as the output target of the security report using an instruction (for example, respective operations of right-click and selection, and respective operations of long tap and selection) or the like of mouse pointer 55 according to the operation input of input device 19 performed by the user (step S61). In this case, in transitional captured images 53, captured image 53c is designated as the output target of the security report. Video monitoring and display device 14 sets designated captured image 53c as the output target of the security report, gives check mark CK (see FIG. 19) to captured image 53c, and displays resulting captured image 53c (step S62).

Figure 16:
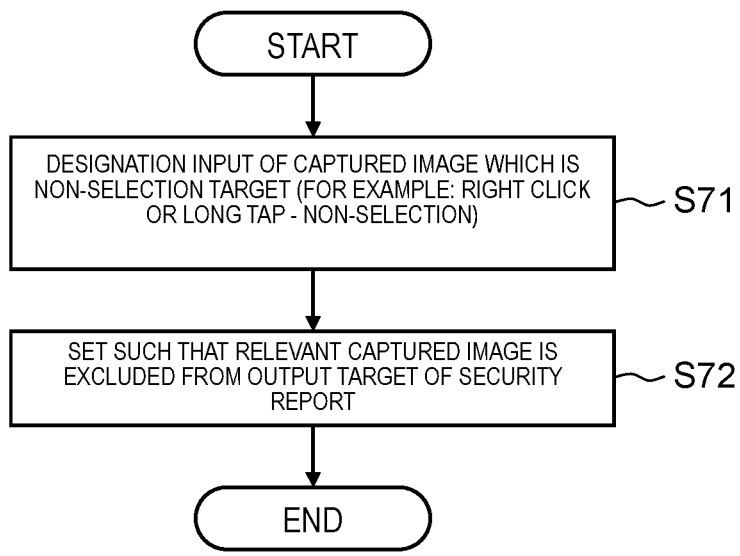
FIG. 16 is a flowchart illustrating an example of a selection release procedure of releasing selection candidates of the captured images which are output as the security report in the transitional captured image display screen illustrated in FIG. 13.

FIG. 16 is a flowchart illustrating an example of a selection release procedure of releasing selection candidates of the captured image which is output as the security report in transitional captured image display screen 51 illustrated in FIG. 13. In FIG. 16, in a case where transitional captured image display screen 51 illustrated in FIG. 13 is displayed, video monitoring and display device 14 receives the designation input of the captured image for selection which is a release (non-selection) target from the output target of the security report according to an instruction (for example, respective operations of right-click and non-selection and respective operations of long tap and non-selection) or the like of mouse pointer 55 according to the operation input of input device 19 performed by the user (step S71). In this case, in transitional captured images 53, captured image 53c, which is selected as the output target of the security report in advance before the designation input in step S71 is performed, is designated as the output target of the security report. Video monitoring and display device 14 performs setting such that designated captured image 53c as the output target of the security report is released, and does not display check mark CK (see FIG. 19) (step S72).

Figure 17:
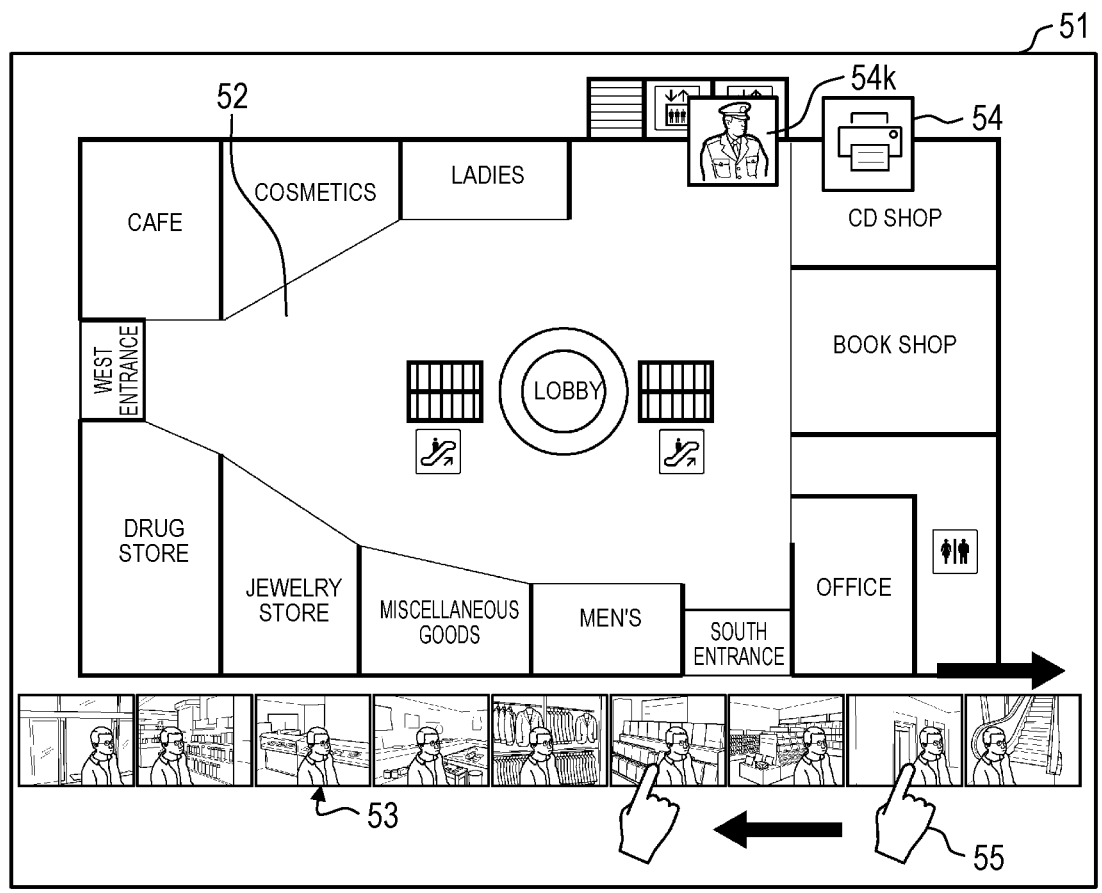
FIG. 17 is a diagram illustrating an example of scrolling and displaying non-display parts previous to or subsequent to transitional captured images in a case where any captured image is dragged and dropped.

Scroll Display of Transitional Captured Image FIG. 17 is a diagram illustrating an example of scrolling and displaying non-display parts previous to or subsequent to transitional captured images in a case where any captured image is dragged and dropped. As illustrated in FIG. 17, in a case where the user manipulates input device 19 and performs movement operation 55 (for example, drag and drop) on transitional captured images 53 using mouse pointer in transitional captured image display screen 51, video monitoring and display device 14 moves and displays an image group of transitional captured images 53 according to the movement operation. Therefore, video monitoring and display device 14 is capable of performing display such that captured images previous or subsequent to the photographed time of the captured images, which are displayed before the movement operation, sequentially appear. For example, in a case where mouse pointer 55 performs a movement operation on transitional captured images 53 in a left direction, video monitoring and display device 14 is capable of displaying an image group of the transitional captured images in which the photographed time is traced back rather than the movement operation.

In addition, in a case where mouse pointer 55 performs the movement operation on transitional captured images 53 in a right direction, video monitoring and display device 14 is capable of displaying the image group of the transitional captured images in which the photographed time is new rather than the movement operation.

Figure 18:
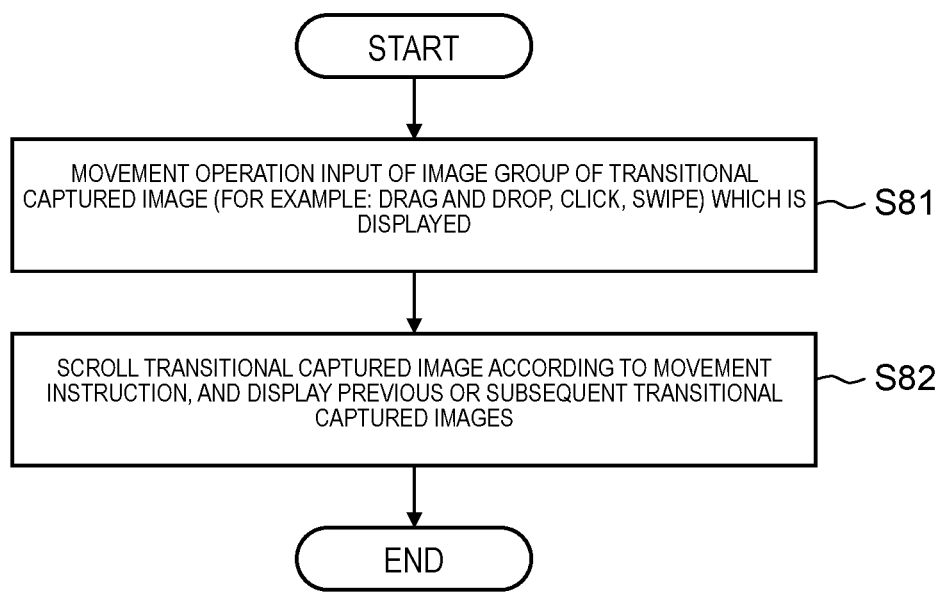
FIG. 18 is a flowchart illustrating an example of a scroll procedure illustrated in FIG. 17.

FIG. 18 is a flowchart illustrating an example of scroll procedure illustrated in FIG. 17. In FIG. 18, in a case where transitional captured image display screen 51 is displayed, video monitoring and display device 14 receives movement operation input of the image group of transitional captured images 53, which are currently being displayed, according to operation (for example, drag and drop, click, swipe) or the like of mouse pointer 55 according to the operation input of input device 19 performed by the user (step S81). In this case, a movement instruction which shows the movement direction and a value of movement corresponding to a scroll target is input in transitional captured images 53. Video monitoring and display device 14 scrolls the image group of transitional captured images 53 according to the movement instruction, and displays the image group of transitional captured images whose photographed time is previous or subsequent to the point of time in which movement operation is input in step S81 (step S82).

Print Output of Security Report

Figure 19:
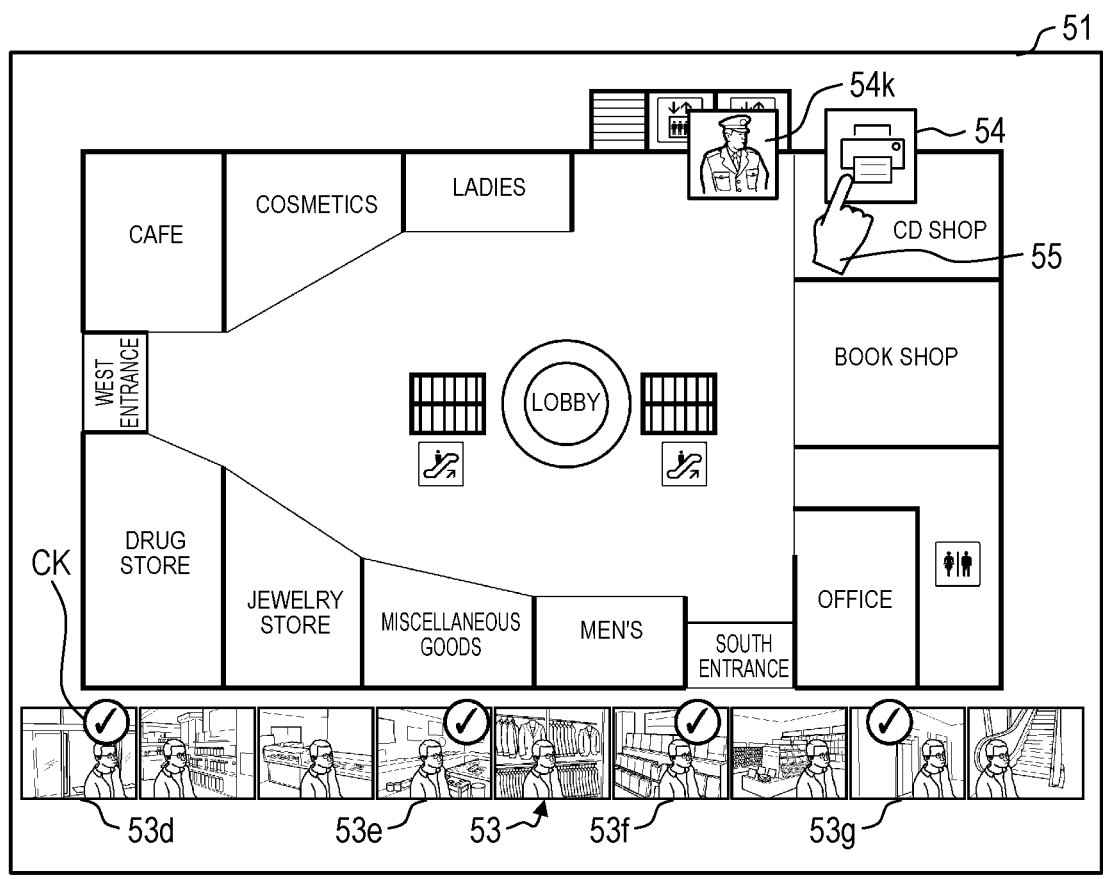
FIG. 19 is diagram illustrating an example of an operation of printing out the security report which includes selected captured images of the suspect.

FIG. 19 is a diagram illustrating an example of an operation of printing out the security report which includes the selected captured images of the suspect. As illustrated in FIG. 19, in a case where the user manipulates input device 19 and performs an instruction operation (for example, click) on security report print button 54 using mouse pointer 55 in transitional captured image display screen 51, video monitoring and display device 14 generates a report of (see FIG. 22) of the security report which displays the captured images selected as the output target of the security report by giving check mark CK, and accident-related information corresponding to the captured images, outputs the generated report to form output device 18 so as to be printed out. In the example of FIG. 19, four captured images 53d, 53e, 53f, and 53g, to which check mark CK is given, are selected among transitional captured images 53, video monitoring and display device 14 generates the report of the security report in which the captured images 53d, 53e, 53f, and 53g, which indicate behavior of the suspect, are chronologically arranged. In the security report, respective captured images 53d, 53e, 53f, and 53g are acquired in such a way that still images corresponding to output image frames selected from a moving image of captured images corresponding to a plurality of frames are output and displayed.

Figure 20:
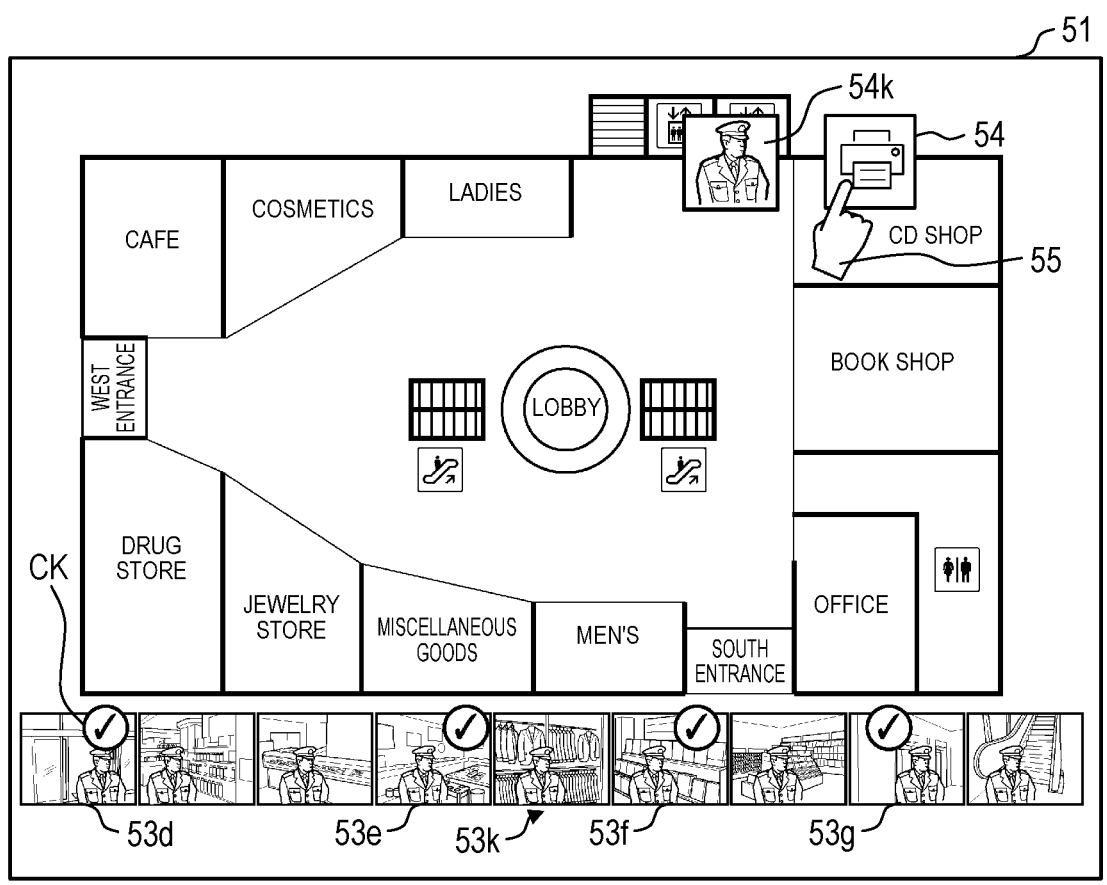
FIG. 20 is diagram illustrating an example of an operation of printing out the security report which includes selected captured images of the guard.

FIG. 20 is diagram illustrating an example of an operation of printing out the security report which includes selected captured images of the guard. As illustrated in FIG. 20, in a case where the user manipulates input device 19 and performs an instruction operation (for example, click) on security report print button 54 using mouse pointer 55 in transitional captured image display screen 51, video monitoring and display device 14 generates the report of the security report (see FIGS. 23 and 24) which displays the captured images selected as the output target of the security report by giving check mark CK and the accident-related information corresponding to the captured images, and outputs the generated report to form output device 18 so as to be printed out. In the example of FIG. 20, four captured images 53d, 53e, 53f, and 53g, to which check mark CK is given, are selected among transitional captured images 53, and video monitoring and display device 14 generates the report of the security report in which the captured images 53d, 53e, 53f, and 53g, which indicate behavior of the guard, are chronologically arranged. In the security report, respective captured images 53d, 53e, 53f, and 53g are acquired in such a way that still images corresponding to output image frames selected from a moving image of captured images corresponding to a plurality of frames are output and displayed.

Figure 21:
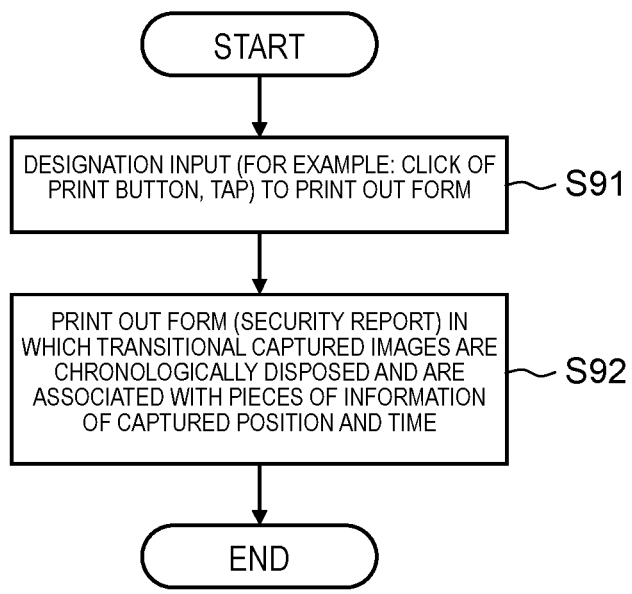
FIG. 21 is a flowchart illustrating an example of a procedure of a printing out operation illustrated in FIG. 19 or 20.

FIG. 21 is a flowchart illustrating an example of a procedure of a printing out operation illustrated in FIG. 19 or 20. In FIG. 21, in a case where transitional captured image display screen 51 is displayed, video monitoring and display device 14 receives instruction input of document print out according to an instruction (for example, click or tap the print button) of mouse pointer 55 according to the operation input of input device 19 performed by the user (step S91). In this case, an operation of pressing security report print button 54 is input in a state in which at least one captured image (for example, a plurality of captured images) is selected as the output target of the security report. Video monitoring and display device 14 generates a form of the security report in which at least one captured image (for example, the plurality of captured images) selected as the output target of the security report among the transitional captured images is chronologically disposed and in which captured position and photographed time as captured attachment information 57 are associated with each captured image, and outputs the form of the security report to form output device 18 so as to be printed out (step S92).

Figure 22:
FIG. 22 is a diagram illustrating an example of a report which is printed out as the security report which includes the captured images of the suspect.

FIG. 22 is a diagram illustrating an example of a report which is printed out as the security report that includes the captured images of the suspect. In report 71 as the security report, face detection source image 72, which is displayed after being enlarged such that features of the suspect are clearly shown, is disposed at the top of report 71, and at least one captured image 73 (for example, a plurality of captured images 73), which is selected as the output target of the security report, is chronologically disposed and displayed on a lower side. Face detection source image 72 is an image of the suspect of a detection source, which is acquired in such a way that suspect face detection is performed by face collation server 17 based on captured images of camera 11, and the facial image, the facial feature metadata, and the like are stored in database 16. A captured image at an angle, which is easy to know the feature of the face of the suspect, is used, and face detection source image 72 becomes a collation-based facial image which is used in a case where face collation is performed. At the bottom of each captured image 73, captured attachment information 74, which includes a name of the captured position, a photographed date, and a photographed time, is displayed as the accident-related information. In the example of FIG. 22, transitional captured images, which include captured images 73 chronologically captured in order of west entrance→cosmetics department→jewelry shop→miscellaneous store→men's wear department→in front of book store (in front of a book shop), are illustrated based on the behavior history of the suspect.

In a case where the user visually browses the report of the security report 71, it is possible to chronologically grasp the feature of the suspect and behavior history until the accident occurrence at a glance. In addition, for example, only in a case where a user who has specific editing authority logs on, captured attachment information button 75 may be displayed in report 71 illustrate in FIG. 22. In a case where the user who has the specific editing authority clicks captured attachment information button 75 using mouse pointer 55 after designating any captured image 73 through operation using input device 19, it is possible to edit captured attachment information 57 of the designated captured image 73.

FIG. 23 is a diagram illustrating an example of a report which is printed out as the security report which includes the captured images of the guard. In report 71k as the security report, face detection source image 72k, which is displayed after being enlarged such that features of the guard are clearly shown, is disposed at the top of report 71k, and at least one captured image 73k (for example, a plurality of captured images 73k), which is selected as the output target of the security report, is chronologically disposed and displayed on a lower side. Face detection source image 72k is an image of the guard of a detection source in which the facial image and the facial feature metadata are stored in database 16 in such a way that guard face detection is performed by face collation server 17 based on captured images of camera 11. The captured image at an angle, which is easy to know the feature of the face of the guard, is used, and face detection source image 72k becomes a collation-based facial image which is used in a case where face collation is performed. At the bottom of each captured image 73k, captured attachment information 74k, which includes a name of the captured position, a photographed date, and a photographed time, is displayed as the accident-related information. In the example of FIG. 23, transitional captured images, which include captured images 73 chronologically captured in order of west entrance cosmetics department jewelry shop, are illustrated based on the behavior history of the guard. Furthermore, in report 71k illustrated in FIG. 23, the behavior history of the guard is listed in detail along respective items of year/month/date, a place name, an acquisition device name, and an event name.

For example, a fact that the guard corresponding to face detection source image 72k installs or possesses authenticated terminal RC and passes through door T1 of a west entrance first is authenticated by authentication device CR-1. Thereafter, after being captured by camera 11-2 of the jewelry shop, collation in performed by face collation server 17. Thereafter, a fact that the guard passes through door T2 of the south entrance is authenticated by authentication device CR-r. Furthermore, thereafter, in a case where the guard goes from the south entrance to a parking lot, a signal from BLE transmission terminal BT-3 is received in BLE reception device BR-3 installed in the parking lot. Thereafter, a fact that the guard passes through door T2 of the south entrance to come back from the parking lot is authenticated by authentication device CR-r. Thereafter, a fact that, after the guard is captured by camera 11-3 of cosmetics department, and collation is performed by face collation server 17.

In a case where the user visually browses the report of the security report 71k, it is possible to chronologically grasp the feature of the guard, the behavior history of the guard who should trace the suspect at a glance in a case where an accident occurs. In addition, for example, only in a case where a user who has specific editing authority logs on, captured attachment information button 75k and behavior history button 76 may be displayed in report 71k illustrated in FIG. 23. In a case where the user who has the specific editing authority clicks captured attachment information button 75k or behavior history button 76 using mouse pointer 55 after designating any captured image 73 through operation using input device 19, it is possible to edit captured attachment information 57 of the designated captured image 73 or the behavior history.

FIG. 24 is a diagram illustrating an example of a subsequent page of report 71k illustrated in FIG. 23. In report 71k illustrated in FIG. 24, an identification number and a name of the guard are displayed at the top of report 71k, and, furthermore, map information image 52 of the monitoring area where the guard patrols is displayed. Other information illustrated in FIG. 24 is the same as in report 71k illustrated in FIG. 23, the description thereof will not be repeated.

As described above, in security system 10 according to the embodiment, the positional information of the guard is preserved in positional information management server 21 in a case where a signal from BLE transmission terminal BT, which is installed or maintained by the guard who patrols the monitoring area of camera 11, is received in BLE reception device BR, in a case where authenticated terminal RC, which is installed or maintained by the same guard, is authenticated in authentication device CR, and in a case where color barcode CM, which is installed or maintained by the same guard, is detected by camera 11. In security system 10, in a case where a matter (for example, an accident, such as shoplifting, or climbing up a fence) in the monitoring area is detected by sensor 12, video monitoring and display device 14 extracts a plurality of captured images, in which a person (that is, a suspect) who causes the matter is captured by camera 11, associates transitional captured images 53, which are chronologically arranged along captured time, with map information image 52 of the captured area, and causes monitor 20 to display the transitional captured images 53 and the map information. In addition, in security system 10, in a case where an operation for switching the suspect to the guard is performed on switching selection screen SEL, video monitoring and display device 14 switches a plurality of captured images, in which the designated guard is captured by camera 11, and a marker (for example, card reader marker MK1 or BLE marker MK2) which shows any one of BLE transmission terminal BT, authenticated terminal RC, and color barcode CM to transitional captured images 53k, which are chronologically arranged along the captured time or guard detection time and map information image 52 of the monitoring area, and causes monitor 20 to display the switching results.

Therefore, in security system 10, in a case where any matter or accident occurs in the monitoring area, sensor 12 detects and reacts to the matter or the accident, and the captured images of the suspect and the guard are extracted from the captured images of camera 11. In addition, with regard to the guard, it is possible to easily acquire the positional information of the guard based on results of various processes (for example, signal reception from BLE transmission terminal BT, authentication of authenticated terminal RC, and detection of color barcode CM) of BLE reception device BR, authentication device CR, or camera 11. Accordingly, in security system 10, it is possible to simply and minutely display intuitive and visual behavior history of the suspect who is related to the occurrence of any matter or accident in the monitoring area or the guard who traces the suspect on monitor 20 in association with map information image 52 of the monitoring area.

In addition, in the security system 10, video monitoring and display device 14 displays the accident-related information which includes the captured position and the photographed time, which are related to designated captured image 53a according to designation of any captured image 53a included in transitional captured images 53 of the suspect or transitional captured images 53k of the guard. Therefore, video monitoring and display device 14 is capable of causing the user to minutely check the accident-related information, such as the captured position and the photographed time corresponding to the designated captured image for both transitional captured images 53 of the suspect and transitional captured images 53k of the guard.

In addition, in security system 10, in the screen in which transitional captured images 53 of the suspect are displayed on monitor 20, security report print button 54, which is used to instruct to generate report 71 as the security report indicative of the behavior history of the suspect, is displayed. Video monitoring and display device 14 causes form output device 18 connected to video monitoring and display device 14 to print report 71 (see FIG. 22) indicative of the behavior history of the suspect using a part or whole captured image 53a included in transitional captured images 53 according to designation of security report print button 54 in a case where the screen is displayed. Therefore, video monitoring and display device 14 is capable of easily acquiring a report document of the intuitive and visual behavior history of the suspect in a case where any matter or accident occurs in the monitoring area by printing output the document of the behavior history of the suspect, and is capable of contributing to obligation for report for business of the security company.

In addition, in security system 10, in the screen in which transitional captured images 53k of the guard are displayed on monitor 20, security report print button 54, which is used to instruct to generate report 71k as the security report indicative of the behavior history of the guard, is displayed.

Video monitoring and display device 14 causes form output device 18 connected to video monitoring and display device 14 to print report 71k (see FIG. 23 or 24) indicative of the behavior history of the guard using a part or whole captured image 53a included in transitional captured images 53k according to designation of security report print button 54 in a case where the screen is displayed. Therefore, video monitoring and display device 14 is capable of easily acquiring a report document of the intuitive and visual behavior history which shows a place and behavior performed by the guard who should tract the suspect in a case where any matter or accident occurs in the monitoring area by printing output the document of the behavior history of the guard, and is capable of contributing to obligation for report for business of the security company.

In addition, in security system 10, the guard previously installs or maintains the color barcode in which a plurality of color patterns are prescribed, and the color barcode is detected by camera 11. Therefore, in security system 10, camera 11 is capable of easily acquiring the positional information of the guard by detecting the color barcode through image process performed on the captured images without disposing, for example, specific transmitters and receivers, such as BLE transmission terminal BT, authenticated terminal RC, BLE reception device BR, and authentication device CR, in order to grasp the positional information of the guard.

In addition, in security system 10 according to the embodiment, the positional information of the guard in the monitoring area is preserved in positional information management server 21 in a case where the signal from BLE transmission terminal BT installed or maintained by the guard who patrols the monitoring area of camera 11 is received in BLE reception device BR, in a case where authenticated terminal RC installed or maintained by the same guard is authenticated in authentication device CR, or in a case where color barcode CM installed or maintained by the same guard is detected by camera 11. In security system 10, in a case where a matter (for example, an accident, such as shoplifting, or climbing up a fence) in the monitoring area is detected by sensor 12, video monitoring and display device 14 extracts a plurality of captured images, in which the guard who traces the person (that is, the suspect) who causes the matter is captured by camera 11, and causes monitor 20 to display the transitional captured images 53k, which are chronologically arranged along captured time, and the map information image 52 of the captured area.

Therefore, in security system 10, in a case where any matter or accident occurs in the monitoring area, sensor 12 detects the matter or the accident, and the captured images of the guard are extracted from the captured images of camera 11. In addition, it is possible to easily acquire the positional information of the guard based on results of various processes (for example, signal reception from BLE transmission terminal BT, authentication of authenticated terminal RC, and detection of color barcode CM) of BLE reception device BR, authentication device CR, or camera 11. Accordingly, in security system 10, it is possible to simply display intuitive and visual behavior history of the guard who traces the suspect and is related to the occurrence of any matter or accident in the monitoring area on monitor 20 in association with map information image 52 of the monitoring area.

As described above, although various embodiments have been described with reference to the accompanying drawings, it is apparent that the present disclosure is not limited to the examples. It is apparent that those skilled in the art easily arrive various changed examples and modified examples in a genre disclosed in claims, and it is also apparent that the examples belong to a technical scope of the present disclosure.

In addition, in the embodiment, even in a case where any of transitional captured images 53 based on the behavior of the suspect and transitional captured images 53k based on the behavior of the guard are displayed on transitional captured image display screen 51, video monitoring and display device 14 may generate the document data of the report by gathering the reports as the respective security reports illustrated in FIGS. 22 to 24 into one report, and may output the document data to form output device 18 to be printed in a case where security report print button 54 is designated through the operation using input device 19 of the user. Therefore, video monitoring and display device 14 is capable of generating reports effectively contributing to obligation for report for business of the security company for both the suspect and the guard.

INDUSTRIAL APPLICABILITY

The present disclosure is useful as a security system and a method for displaying images of people in which it is possible to simply display intuitive and visual behavior history of a suspect related to occurrence of any matter or accident in a monitoring area and a guard who traces the suspect.

REFERENCE MARKS IN THE DRAWINGS

10 SECURITY SYSTEM
11, 11-1 to 11-$n$ CAMERA
12, 12-1 to 12-$k$ SENSOR
13, 13-1 to 13-$m$ RECORDER
14 VIDEO MONITORING AND DISPLAY DEVICE
15 VARIOUS-SENSOR MANAGEMENT DEVICE
16 DATABASE
17 FACE COLLATION SERVER
18 FORM OUTPUT DEVICE
19 INPUT DEVICE
20 MONITOR
21 POSITIONAL INFORMATION MANAGEMENT SERVER
22 GUARD INFORMATION MANAGEMENT SERVER
25 NETWORK
51 TRANSITIONAL CAPTURED IMAGE DISPLAY SCREEN
52 MAP INFORMATION IMAGE
53, 53k TRANSITIONAL CAPTURED IMAGE
53a, 73, 73k CAPTURED IMAGE
54 SECURITY REPORT PRINT BUTTON
54k SWITCHING SELECTION BUTTON
55 MOUSE POINTER
56 CAPTURED POSITION MARK
57, 74 CAPTURED ATTACHMENT INFORMATION
61 CAPTURED IMAGE ENLARGEMENT DISPLAY SCREEN
62 VIDEO REPRODUCTION SCREEN
71, 71k REPORT
72 FACE DETECTION SOURCE IMAGE
75 CAPTURED ATTACHMENT INFORMATION BUTTON
76 BEHAVIOR HISTORY BUTTON
141 VIDEO MONITORING CONTROLLER
142 SECURITY REPORT PRINT PROCESSOR

BR, BR-1, BR-p BLE RECEPTION DEVICE
BT, BT-1, BT-p BLE TRANSMISSION TERMINAL
CK CHECK MARK
CM, CM-1, CM-r COLOR BARCODE
CR, CR-1, CR-r AUTHENTICATION DEVICE
MK1 CARD READER MARKER
MK2 BLE MARKER
RC, RC-1, RC-r AUTHENTICATED TERMINAL
SEL SWITCHING SELECTION SCREEN

The invention claimed is:

1. A security system, comprising:
a plurality of cameras that captures images of a predetermined monitoring area, each of the plurality of cameras being at a different position in the predetermined monitoring area;
a recorder that records the captured images captured by the plurality of cameras;
a sensor that detects a predetermined matter in the monitoring area based on a predetermined detection condition; and
a video monitoring and display device to which the captured images from the plurality of cameras or the recorder is input, and which displays one or more of the captured images,
wherein the video monitoring and display device:
extracts a plurality of the captured images in which a suspect of the matter is captured from the captured images recorded by the recorder in response to the predetermined matter being detected in the monitoring area,
chronologically displays transitional captured images in time series based on a behavior of the suspect by using the extracted captured images,
displays a map information image that represents the predetermined monitoring area,
concurrently displays a plurality of captured positions on the map information image, and,
in response to an input of designating a transitional captured image from the displayed transitional captured images being received, displays capture information of a corresponding captured position of the plurality of captured positions,
wherein the displayed transitional captured images are captured by different cameras of the plurality of cameras,
wherein each of the displayed transitional captured images displays the suspect at a respective time in the time series,
wherein the video monitoring and display device displays the capture information, the transitional captured images, the map information image, and the plurality of captured positions concurrently,
wherein the capture information includes at least one of a name of a location in the predetermined monitoring area, a capture date of the designated transitional captured image, or a capture time of the designated transitional captured image,
wherein the corresponding captured position is a position of a camera that captured the designated transitional captured image,
wherein each of the plurality of captured positions is a position of a camera of the plurality of cameras that captured at least one of the displayed transitional captured images.

2. The security system of claim 1, wherein the video monitoring and display device displays a captured image before or after a captured time by causing the displayed transitional captured images to be scrolled according to a move instruction when an input of a move operation of a display image for the displayed transitional captured images is received.

3. The security system of claim 1, wherein the video monitoring and display device displays a captured image reproduction screen for reproducing a corresponding captured image in a state of being enlarged and displayed when an input of an enlarged display instruction of any of the captured images for the displayed transitional captured images is received.

4. The security system of claim 1 wherein the extracting of the plurality of the captured images includes selecting a single frame every predetermined number of frames.

5. The security system of claim 1 wherein the video monitoring and display device displays indicators on the map information that indicate a chronological order of the plurality of captured positions.

6. The security system of claim 5 wherein each the indicators extend from one of the plurality of captured positions to another one of the plurality of captured positions.

7. A method for displaying images of people in a security system, comprising:
capturing, by a plurality of cameras, images of a predetermined monitoring area, each of the plurality of cameras being at a different position in the predetermined monitoring area;
recording, by a recorder, the captured images captured by the plurality of cameras;
detecting, by a sensor, a predetermined matter in the monitoring area based on a predetermined detection condition;
inputting the captured images from the plurality of cameras or the recorder and into a video monitoring and display device; and
displaying, by the video monitoring and display device, one or more of the captured images,
wherein the displaying of the one or more of the captured images by the video monitoring and display device includes:
extracting a plurality of the captured images in which a suspect of the matter is captured from the captured images recorded by the recorder in response to the predetermined matter being detected in the monitoring area,
chronologically displaying transitional captured images in time series based on a behavior of the suspect by using the extracted captured images,
displaying a map information image that represents the predetermined monitoring area,
concurrently displaying a plurality of captured positions on the map information image, and,
in response to an input of designating a transitional captured image from the displayed transitional captured images being received, displaying capture information of a corresponding captured position of the plurality of captured positions,
wherein the displayed transitional captured images are captured by different cameras of the plurality of cameras,
wherein each of the displayed transitional captured images displays the suspect at a respective time in the time series,
wherein the video monitoring and display device displays the capture information, the transitional captured images, the map information image, and the plurality of captured positions concurrently, wherein the capture information includes at least one of a name of a location in the predetermined monitoring area, a capture date of the designated transitional captured image, or a capture time of the designated transitional captured image, wherein the corresponding captured position is a position of a camera that captured the designated transitional captured image, wherein each of the plurality of captured positions is a position of a camera of the plurality of cameras that captured at least one of the displayed transitional captured images.

8. A security system, comprising:

a plurality of cameras that captures images of a predetermined monitoring area, each of the plurality of cameras being at a different position in the predetermined monitoring area;

a recorder that records the captured images captured by the plurality of cameras;

a sensor that detects a predetermined matter in the monitoring area based on a predetermined detection condition; and a video monitoring and display device to which the captured images from the plurality of cameras or the recorder is input, wherein the video monitoring and display device:

extracts a plurality of the captured images in which a suspect of the matter is captured from the captured images recorded by the recorder in response to the predetermined matter being detected in the monitoring area;

chronologically displays transitional captured images in time series based on a behavior of the suspect by using the extracted captured images, the displayed transitional captured images being captured by different cameras of the plurality of cameras, each of the displayed transitional captured images displays the suspect at a respective time in the time series;

displays a map information image that represents the predetermined monitoring area;

concurrently superimposes a plurality of captured positions on the map information image, each of the plurality of captured positions being a position of a camera of the plurality of cameras that captured at least one of the displayed transitional captured images; and in response to a transitional captured image of the displayed transitional captured images being selected, displays capture information of a corresponding captured position of the plurality of captured positions, the capture information, the transitional captured images, the map information image, and the plurality of captured positions being displayed by the video monitoring and display device concurrently, the corresponding captured position being a position of a camera of the plurality of cameras that captured the selected transitional captured image, the capture information includes at least one of a name of a location in the predetermined monitoring area, a capture date of the designated transitional captured image, or a capture time of the designated transitional captured image.

9. The security system of claim 8, wherein the video monitoring and display device executes at least one of a screen display on a monitor connected to the video monitoring and display device, or a print output to a printing device connected to the video monitoring and display device.

10. A method for a security system, the method comprising:

capturing, by a plurality of cameras, images of a predetermined monitoring area, each of the plurality of cameras being at a different position in the predetermined monitoring area;

recording, by a recorder, the captured images captured by the plurality of cameras;

detecting, by a sensor, a predetermined matter in the monitoring area based on a predetermined detection condition; and inputting the captured images from the plurality of cameras or the recorder and into a video monitoring and display device; and displaying, by the video monitoring and display device, one or more of the captured images, wherein the displaying of the one or more of the captured images by the video monitoring and display device includes:

extracting a plurality of the captured images in which a suspect of the matter is captured from the captured images recorded by the recorder in response to the predetermined matter being detected in the monitoring area;

chronologically displaying transitional captured images in time series based on a behavior of the suspect by using the extracted captured images, the displayed transitional captured images being captured by different cameras of the plurality of cameras, each of the displayed transitional captured images displays the suspect at a respective time in the time series;

displaying a map information image that represents the predetermined monitoring area;

concurrently superimposing a plurality of captured positions on the map information image, each of the plurality of captured positions being a position of a camera of the plurality of cameras that captured at least one of the displayed transitional captured images; and in response to a transitional captured image of the displayed transitional captured images being selected, displaying capture information of a corresponding captured position of the plurality of captured positions, the capture information, the transitional captured images, the map information image, and the plurality of captured positions being displayed by the video monitoring and display device concurrently, the corresponding captured position being a position of a camera of the plurality of cameras that captured the selected transitional captured image, the capture information includes at least one of a name of a location in the predetermined monitoring area, a capture date of the designated transitional captured image, or a capture time of the designated transitional captured image.

* * * * *